(12) United States Patent
Jankovic et al.

(10) Patent No.: US 10,398,005 B1
(45) Date of Patent: *Aug. 27, 2019

(54) DYNAMICALLY TUNABLE MATERIALS FOR PARITY-TIME SYMMETRIC ELECTRO-OPTICAL DEVICES

(71) Applicant: NORTHROP GRUMMAN SYSTEMS CORPORATION, Falls Church, VA (US)

(72) Inventors: Vladan Jankovic, Los Angeles, CA (US); Jennifer Dionne, Menlo Park, CA (US); Brian Keith Baum, Portland, OR (US); Hadiseh Alaeian, Evanston, IL (US); Mark Lawrence, San Francisco, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,214

(22) Filed: Nov. 28, 2018

Related U.S. Application Data

(63) Continuation of application No. 15/683,292, filed on Aug. 22, 2017, now Pat. No. 10,178,735.

(51) Int. Cl.
| | | |
|---|---|---|
| *H01J 1/62* | (2006.01) |
| *H05B 33/14* | (2006.01) |
| *C01B 19/00* | (2006.01) |
| *H01P 1/20* | (2006.01) |
| *C01G 31/02* | (2006.01) |
| *C01G 17/00* | (2006.01) |
| *C01G 15/00* | (2006.01) |
| *G02F 1/313* | (2006.01) |
| *C01G 7/00* | (2006.01) |
| *C01B 33/113* | (2006.01) |

(52) U.S. Cl.
CPC ......... *H05B 33/145* (2013.01); *C01B 19/007* (2013.01); *C01G 17/00* (2013.01); *C01G 31/02* (2013.01); *H01P 1/2002* (2013.01); *C01B 33/113* (2013.01); *C01G 7/00* (2013.01); *C01G 15/006* (2013.01); *C01P 2004/64* (2013.01); *G02F 1/313* (2013.01)

(58) Field of Classification Search
None
See application file for complete search history.

(56) References Cited

U.S. PATENT DOCUMENTS

| | | |
|---|---|---|
| 7,135,055 B2 | 11/2006 | Mirkin et al. |
| 8,216,518 B2 | 7/2012 | Chau et al. |
| 8,749,866 B2 | 6/2014 | Sweatlock et al. |
| 2015/0295379 A1 | 10/2015 | Ozdemir et al. |
| 2016/0035990 A1 | 2/2016 | Jankovic et al. |

*Primary Examiner* — Vip Patel
(74) *Attorney, Agent, or Firm* — Tarolli, Sundheim, Covell & Tummino LLP

(57) ABSTRACT

A device includes a light adjustment apparatus having at least one material having a dielectric permittivity, the at least one material to affect the flow of light, wherein the light adjustment apparatus includes a tunable material to enable adjustment of the dielectric permittivity of the at least one material.

20 Claims, 20 Drawing Sheets

CONTROL OF ε″(ω): THROUGH CENTRIFUGATION (AU NP CONCENTRATION)

CONTROL OF ω: SYNTHESIS CHEMISTRY

AU NANO RODS IN AQUEOUS SOLUTION

AU NANO RODS IN POLYMER HOST MATRIX

DYNAMICALLY TUNABLE MATERIALS FOR PARITY-TIME SYMMETRIC ELECTRO-OPTICAL DEVICES

RELATED APPLICATIONS

This application claims priority from U.S. patent application Ser. No. 15/683,292, filed 22 Aug. 2017, which is incorporated herein in its entirety.

TECHNICAL FIELD

This disclosure relates to Parity-Time (PT) Symmetric Optoelectronic devices, and more specifically to materials that provide dynamic dielectric permittivity tuning capability for dynamic tuning between operation below and above the optical exceptional point.

BACKGROUND

The continued scaling of electronic integrated circuits (ICs) will at some point cause industry to transition certain electronic computation and communication operations to equivalent photonic systems in order to mitigate thermal management and signal latency concerns. Integrated photonics is concerned with developing the materials, devices, and systems necessary for the manipulation of optical signals and energy within waveguide networks. This term is generally used to highlight the distinction between integrated photonic circuits relative to other common form factors for optical devices (free space beams, fiber optics, etc.) The phrase is a deliberate analogy to the name given to the parallel discipline of integrated electronics and electronic integrated circuits (ICs), the design concept and material systems that have enabled decades of successful scaling of size, power, and cost of components for electronic signal processing.

One of the prime technical drivers for photonic integration has been tele- and data-communications. Long-range communications have used optical links for many years, taking advantage of high bandwidth and low propagation loss relative to electronic links. However, to date, electronics have still proven to be the superior choice for high-density computation, since electronic signal processing components are ultra-compact (e.g., a single transistor device is about ten nanometers), utilize low power, and are nonlinear. This tension between two technology solutions with distinct strengths and weaknesses has led to a proliferation of hybrid optoelectronic systems for computing, data, and telecom infrastructure. Due to the ubiquity, utility, and commercial importance of such systems there is demand for technology that impacts this space including optical sources, detectors, modulators, switches, isolators, and so forth.

SUMMARY

This disclosure relates to materials that provide dynamic dielectric permittivity tuning capability for Parity-Time Symmetric electro-optical devices. In one aspect, a device includes a light adjustment apparatus having at least one material having a dielectric permittivity, the at least one material to affect the flow of light, wherein the light adjustment apparatus includes a tunable material to enable adjustment of the dielectric permittivity of the at least one material.

In another aspect, a method includes forming a substrate for a photonic integrated device. The method includes forming a base layer on the substrate. The method includes forming a first nanoparticle layer in a portion of the base layer that includes a first dielectric permittivity material. The method includes forming a second nanoparticle layer in another portion of the base layer that includes a second dielectric permittivity material. At least one of the first nanoparticle layer and the second nanoparticle layer include a tunable material to enable adjustment of the first or second dielectric permittivity of the respective layers.

In yet another aspect, a photonic integrated circuit includes a first structure that includes a first dielectric permittivity. A second structure includes a second dielectric permittivity. The first and the second structure include a tunable material to enable adjustment of the dielectric permittivity of the respective structures. The tunable material of the first or second structure includes nanoparticles incorporated in a silica sol gel or optically transparent polymer.

DETAILED DESCRIPTION

Figure 1:
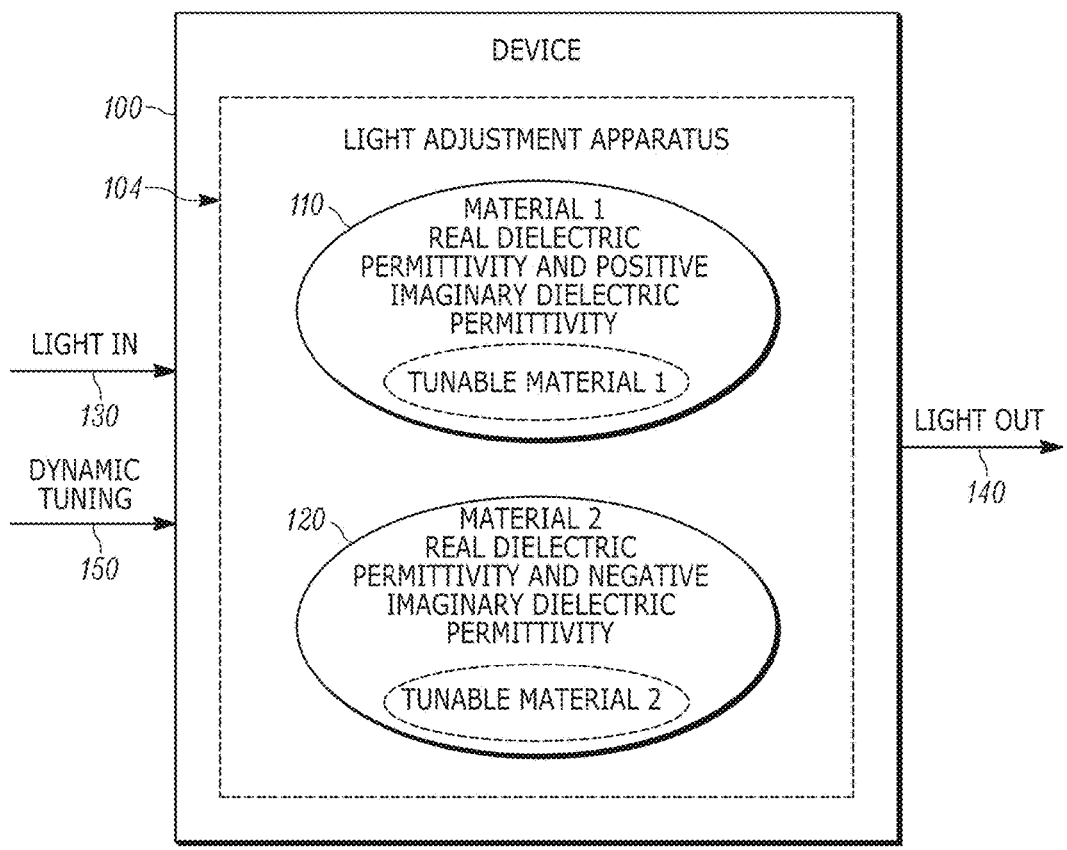
FIG. 1 illustrates an example of a device that employs tunable materials to adjust the optical characteristics of the device.

This disclosure relates to materials that provide dielectric permittivity tuning capability for electro-optical devices. This includes materials employed for construction of electro-optical devices having paired structures that have balanced loss and gain in coupled photonic structures that can include optical diodes, waveguides, lasers, and optical filters, for example. Such devices can operate based on parity-time (PT) symmetry to provide a complex conjugate dielectric permittivity profile for the optical modes of interest by configuring the devices with paired material structures that have the same real dielectric permittivity but opposite and equal imaginary components of the dielectric permittivity. Tunable materials can be applied to, or incorporated within the photonic or plasmonic structures to enable dynamic and/or static adjustment of the imaginary dielectric permittivity portions of the respective structures. Dynamic adjustment can include applying a temperature, light pulse, and/or electrical pulse to the tunable material which alters the optical properties of the device and thus changes its operating characteristics in real time.

The PT Symmetry-based devices described herein provide balanced amounts of loss and gain to photonic or plasmonic devices. In such systems, there can be a sharp, symmetry-breaking transition when a threshold non-Hermiticity parameter exceeds a certain threshold value. In such a system, the Hamiltonian and the parity-time operator no longer have the same set of eigen-functions (even though they commute) and as a result, the eigenvalues of the system cease to be real. In addition, this broken parity-time symmetry phase is associated with the appearance of optical exceptional points, where the eigenvalue branches merge and parity-time symmetry breaks down. This behavior can be exploited in a systematic, controllable, reproducible manner in which many different electro-optical devices can be realized. A few possibilities include coaxial architectures incorporating PT symmetric index distributions, allowing multiplexing and polarization control on the nanoscale with plasmonic PT symmetry and control of orbital angular momentum states in these systems. Other possibilities include non-reciprocal light transmission using coupled micro-disk, micro-ring and/or micro-toroid optical resonators or inverse-based designs. Coherent perfect absorption (CPA), on-chip single mode lasing, and dynamically tunable sinks and sources for photonic integrated circuits can be provided as well as high power lasers.

The PT Symmetric on-chip devices and photonic integrated circuit systems can be constructed, for example, using complementary metal oxide (CMOS) compatible semiconductor processing. In an example device such as a waveguide having complimentary structures such as channels, one channel, the gain channel (negative imaginary dielectric permittivity), can employ rhodamine 6G dye or Yb:Er:$Y_2O_3$ nano-particles doped in an optically transparent substrate that can be, for example, glass, silica, or an optically transparent polymer, such as polymethyl methacrylate (PMMA) or SU-8. The other channel, the loss channel (negative imaginary refractive component), can be doped with Au/SiO2 core/shell nanospheres or nanorods for example, which are optically absorptive. Tunable materials such as VO2 or GeTe can be added or substituted (e.g., in place of Au/SiO2) to allow adjustment of the imaginary dielectric permittivity of one or more structures of the device such as waveguide channels in this example. The device structures may be arranged, for example, as a ring resonator with the gain and loss structures configured azimuthally around a ring, as a two parallel waveguide structures, as a paired disk optical diode, or as a thin-film stack with alternating gain and loss structures, for example.

Using the described materials, photonic or plasmonic PT-symmetric devices can be constructed that exhibit operation above the optical exceptional point behavior in one state, when optical energy is concentrated in the gain structure, or propagation of light in each of the modes, when operated below exceptional point. Balanced amounts of loss and gain permit for the construction of, for example, an on-chip optical isolator or diode device to allow one-directional flow of information, thus achieving a non-reciprocal photonic device that can support higher photonic integration.

FIG. 1 illustrates an example of a device 100 that employs tunable materials to adjust the dielectric permittivity of a photonic device. As used herein, the term device can include any optical device that employs complimentary material and/or structural pairs to pass, block, steer, or filter light. Also, as used herein, the term complimentary structure or material refers to a pair of structures or materials to manipulate light where one of the structures or materials is associated with a positive imaginary dielectric permittivity (e.g., loss structure) and the other structure or material in the pair is associated with a negative imaginary dielectric permittivity (e.g., gain structure).

The device includes 100 includes a light adjustment apparatus 104 having a first material 110 and a second material 120. The light adjustment apparatus 104 is shown as a dotted line since in one example each of the materials 110 and 120 may be formed as separate structures such as on a common base layer. In another example, one of the materials may provide a base layer and the other material is embedded or deposited within the material providing the respective base layer. As shown, the device 100 receives light at an input 130 (or inputs) and provides light at output 140 that has been manipulated and/or processed by the materials 110 and 120. The first material 110 includes a first real dielectric permittivity and a positive imaginary dielectric permittivity. The second material 120 includes a second real dielectric permittivity and a negative imaginary dielectric permittivity. The first and second materials 110 and 120 affect the flow of light. The light adjustment apparatus 104 includes a tunable material in one or both of the materials 110 and 120 to enable adjustment of the dielectric permittivity of the respective materials.

The first material 110 and the second material 120 of the light adjustment apparatus 104 can be formed as a single structure via an inverse-device construction that maps real and imaginary dielectric permittivity space. Selected areas of the structure operate at an operating frequency as a loss media to attenuate an input signal 130 at the operating frequency or operate as a gain media to amplify the input signal at the operating frequency. The device 100 can include a dynamic tuning input 150 to allow dynamic tuning of the tunable materials described herein. Dynamic tuning can include a temperature pulse, electrical pulse, or a light pulse that is applied to the tunable material of the device 100 to dynamically and controllably adjust the real and/or imaginary dielectric permittivity of at least one of the first and second gain or loss media.

The tunable material can be configured as at least one of a nanoparticle, a nanosphere, a nanorod, and a nanostar, where the size of the nanoparticle, the nanosphere, the nanorod, and the nanostar is adjusted to control the resonant optical frequency response of at least one of the first and second materials 110 and 120. The tunable material of the second material 120 includes at least one of Vanadium Dioxide (VO2) and Germanium Tellurium (GeTe) mixed in a transparent optical polymer or sol gel matrix to provide dynamic adjustment of the dielectric permittivity of the device. Gold (Au) nanoparticles can be added to the tunable material of the second material to provide static adjustment of the imaginary dielectric permittivity of the second material. As used herein, the term static adjustment refers to a specific value of a given dielectric permittivity of the structures that is set at the time of manufacture of the device 100. The refractive offset value can later be dynamically adjusted during operation of the device 100 via the dynamically tunable materials described herein.

The tunable material can include at least one of Gold (Au) nanospheres, nanorods or nanostars encapsulated in Silicon Dioxide (SiO2), and Au nanospheres, nanorods or nanostars encapsulated in Silicon Dioxide (SiO2) and Vanadium Dioxide (VO2) in a Au/SiO2/VO2 core/shell/shell configuration, mixed in a transparent optical polymer or silica sol gel matrix that includes at least one of Poly-Methyl Methacrylate (PMMA), Polydimethylsiloxane (PDMS), (SU-8) and Silica sol gel materials, for example. The tunable negative dielectric permittivity of the second material 120 includes Ytterbium (Yb):Erbium (Er):diYttrium (Y2) Trioxide (O3) (Yb:ErY2O3), or Ytterbium (Yb):Thulium (Tm):diYttrium (Y2) Trioxide (O3) (Yb:Tm:$Y_2O_3$) mixed in an optical polymer or sol gel matrix that includes at least one of Polymethyl Methacrylate (PMMA), Polydimethylsiloxane (PDMS), (SU-8) and Silica Sol gel materials.

The tunable negative dielectric permittivity of the second material 120 includes Rhodamine 6G, Rhodamine B, or Fluorescein mixed in mixed in a transparent optical polymer or sol gelmatrix that includes at least one of Polymethyl Methacrylate (PMMA), Polydimethylsiloxane (PDMS), (SU-8) and Silica sol gel materials. The dielectric permittivity of the first material 110 includes Zinc Oxide (ZnO), Gallium Nitrate (GaN), Indium Phosphate (InP), or Indium Gallium Arsenide (InGaAs). The first and second materials 110 and 120 can be configured as complimentary disks in an optical diode, as complimentary channels of a waveguide, as alternating sections of balanced loss and gain azimuthally arranged about a micro-ring resonator, or an inverse design-based structure in which the regions of loss and gain are optimized for the desired operation frequency and functionality. The first material 110 can be configured as a toroid where the second material 120 is implanted as sections within the toroid. The toroid enables a mode selective laser or an optical filter.

In an alternative aspect, the device 100 can be implemented as a photonic integrated circuit. The circuit can include a first structure that includes a first real dielectric permittivity and a positive imaginary dielectric permittivity. The circuit includes a second structure that includes a second real dielectric permittivity and a negative imaginary dielectric permittivity. The first and the second structure include a tunable material to enable adjustment of the dielectric permittivity of the respective structures. The tunable material of the first or second structure includes at least one of Vanadium Dioxide (VO2) and Germanium Tellurium (GeTe) nanoparticles incorporated in a silica sol gel or optically transparent polymer. The first and second structure can be configured as complimentary channels of a coupled parallel waveguide pair, a coupled micro-disk pair, a micro-toroid pair, or an on-chip integrated ring resonator pair in an optical diode. In some implementations, there can be a plurality of complimentary structure pairs in the device 100 where the plurality of pairs cooperates to pass, block, filter, or steer light.

The first and second materials 110 and 120 can be optically coupled and can be pairs of any one of the following configurations such as optically resonant microspheres, micro-toroids, on-chip integrated micro-ring resonators, on-chip integrated waveguides or optical fibers, for example. The optical signal input port 130 and output port 140 can be in the form of a tapered optical fiber, an integrated photonic SiO2, Si, InP or optically transparent polymer-based waveguide, or any other form or method that controllably confines defined optical modes and can out-couple to a resonant structure.

A single structure can be provided with a photonic crystal periodic structure of alternating areas of gain and loss. Periodic areas that at the device operation frequency behave as loss media (attenuate the signal at the operating frequency) or gain media (amplify the signal at the operating frequency) and amplify or attenuate the input signal in a balanced manner. Micro or nano-waveguide interconnects can be provided for module (or chip-) level integration, including cross-couplers, add/drop filters, and cavities, material and device fabrication processes for optical components compatible with electronic processing standards (e.g., complementary metal oxide semiconductor (CMOS) and optical data storage and processing.

An inverse-based design optimization method can be provided to configure the materials 110 and 120 that can start from the device performance specifications (e.g., a 1555 nm filter), put in constraints into model (e.g., work with Si, SiO2 and air (use frequency dependent real and imaginary permittivities of Si, SiO2 and air in a specific (e.g., 5 nm range) around the device operation wavelength of 1555 nm) and set the on-chip device area to be less than 10 micrometer squared). Inverse-based design techniques consider and iterate through many possible spatial distributions of the three constituent materials (e.g., Si, SiO2 and air) and produce a spatial distribution map of the desired real and imaginary dielectric permittivities (corresponding to the spatial distribution of Si, SiO2 and air) to perform the desired function (in this example, filtering 1555 nm light out of an input port 130).

A micro-sphere, micro-toroid, micro-disk or micro-ring resonator can be coupled with tapered optical fibers or integrated photonic waveguides to form a 4-port device known as an add-drop filter, for example. An add-drop filter has 2 inputs (ports 1 and 2) and 2 outputs (ports 3 and 4), where the input light or optical signal is introduced into port 1, resonates in a micro-sphere, micro-toroid, micro-disk or micro-ring optical resonator and light is detected in both output ports 3 and 4, where the light in channel 3 has a missing spectral component, 1555 nm light. This wavelength is resonant with a micro-sphere, micro-toroid, micro-disk or micro-ring optical resonator and is "dropped" from output 1 (hence the name add-drop filter). It resonates in the micro-sphere, micro-toroid, micro-disk or micro-ring optical resonator and out-couples into the tapered optical fiber or integrated photonic waveguide that represents input port 2 and output port 4 ('upstream' and 'downstream' of the micro-sphere, micro-toroid, micro-disk or micro-ring optical resonator, respectively).

The optical fiber or integrated photonic waveguide that represents output port 4 then contains 1555 nm light (drop channel). It is also possible to out-couple light into channel 2 by using two coupled micro-sphere, micro-toroid, micro-disk or micro-ring optical resonators. An inverse-based design would not be constrained to the use of easily manufacturable and intuitive designs such as micro-sphere, micro-toroid, micro-disk or micro-ring optical resonators or coupled micro-sphere, micro-toroid, micro-disk or micro-ring optical resonators and tapered optical fibers or integrated photonic waveguides. Some designs may the product of an advanced optimization that takes as it's input the device operating specifications, (e.g., filter linearly polarized, 1555 nm wavelength light) out of an optical fiber or on-chip integrated photonic waveguide at 2 mW power, for example. The inverse-design based device method/configuration can calculate the spatial distribution of real and imaginary dielectric permittivity values that to filter out 1555 nm wavelength light out of an optical fiber or on-chip integrated waveguide subject to the constraints imposed at the onset, where input of 3 (or other number) specific dielectric permittivity functions (those of Si, SiO2 and air) are utilized.

This spatial distribution may not fit that of a traditional design like a micro-sphere, micro-toroid, micro-disk or micro-ring optical resonator and tapered optical fibers or integrated photonic waveguide-design but can take the shape of fish-bone, topological map or arbitrary shape. The electro-magnetic modes propagating through the inverse-design based structure interact with structures that have the dielectric permittivity profiles for the structure to separate out 1555 nm light (in this example) from the other wavelengths and modify the optical path of light of that wavelength such that a portion (efficiency can be programmed in as a hard or soft constraint) exits out the output port 140 (or ports). Firmer material constraints can be applied (for example, requiring the inverse-based design device to contain the real and imaginary dielectric permittivity values of Si, SiO2 and air) which may lead to lower efficiency, while more flexible material constraints (for example the ability to design or even dynamically tune the dielectric permittivity of the device materials) can result in improved performance and more easily attained design constraints.

The device 100 and systems/methods described herein provide a spectrally flexible, facile, inexpensive and reproducible material system to realize the PT Symmetry-based optical devices. Although some previous PT Symmetric devices have been attempted, the loss of the device is in general a fixed constant and cannot be dynamically adjusted during operation of the device, (e.g., it is the inherent loss (imaginary dielectric permittivity) of silica (SiO2), Si, Ge, GaAs, InP, InGaAs at the device operating frequency). The devices and materials described herein addresses that limitation by providing a CMOS-compatible, facile processing material system capable of providing a spectrally and absorption cross-section-matched pair of optically transparent and CMOS-processing compatible devices. This includes PT-Symmetric material pairs with passively and actively tunable real and imaginary dielectric permittivities in industry-relevant spectral ranges (visible to near infra-red (Vis-NIR) wavelengths), (e.g., 532 nm, 650 nm, 810 nm, 980 nm, 1064 nm, 1310 nm and 1555 nm). Wavelengths beyond 1555 nm (e.g. >2000 nm) may be attainable with continued progress in synthetic processing techniques or hybrid top-down, bottom up techniques of transferring photo-lithography or electron-beam lithography defined images from surfaces to colloidal dispersions and subsequent incorporation into sol-gel host media.

The spectral tunability of the loss material described herein can be achieved by adjusting the shape, size and aspect ratio of the gold nanosphere, nanostar or nanorod to the gain spectrum of the complementary photoluminescent ion, molecule, quantum dot or quantum well gain pair. For example, if Er3+ ions embedded in a silica sol gel or optically transparent polymer medium are used as the gain medium, a specific concentration of Au nanorods of aspect ratio 2.5 (corresponding to a wavelength that attenuates (loss) an optical signal that matches one of the Er3+ emission wavelengths which would amplify (provide gain) an optical signal of the same frequency. The ratio of Er3+ ions in the gain channel silica sol gel or polymer to Au nanorods (of aspect ratio 2.5) in the same host matrix determines the non-Hermiticity of the system.

A measure of the optical gain and loss balance of the system can be calculated by considering the absorption cross section of a single Au nanorod of aspect ratio 2.5 (e.g. 10 nm in the transverse dimension and 25 nm in the longitudinal dimension) and the emission cross section of a single Er3+ ion in a silica sol gel at a specific pump frequency. At the operating frequency, the degree of the balance between the attenuation of loss channel to the amplification of the gain channel determines the non-Hermiticity of the PT-Symmetric include coupled optical fiber networks, coupled integrated on-chip waveguides, optical gratings with alternating sections of loss and gain, coupled micro-ring resonators, coupled toroids, coupled micro-sphere resonators, photonic crystals and inverse-based design devices, for example.

Figure 2:
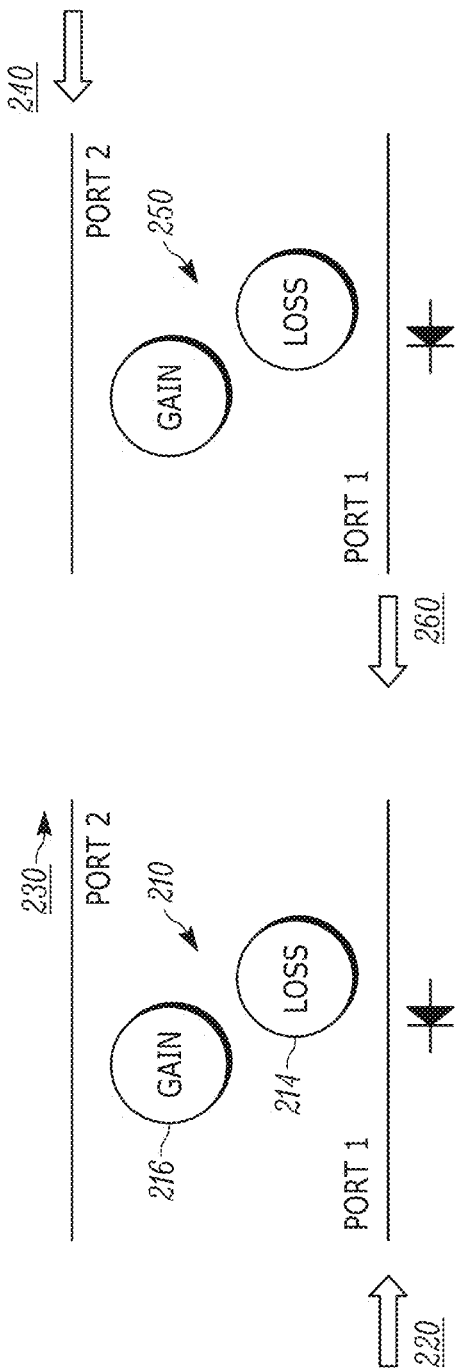
FIG. 2 illustrates an example of an optical diode that utilizes tunable complimentary disk structures to form the diode.

FIG. 2 illustrates an example of an optical diode that utilizes tunable complimentary disk structures to form the diode. At device 210, a diode is formed utilizing complimentary disk structures shown as cavity 214 and cavity 216. As a light pulse 220 is applied to port 1 of the device 210, a reduced light pulse 230 is shown exiting at port 2 of the device 210. Thus, in the direction shown for the light pulse 230 entering the device 210 at port 1, most (if not all) of the light is blocked at port 2. When light is applied in the opposite direction such as shown via pulse 240 applied to device 250 at port 2, light exits port 1 at 260 in substantially the same amplitude as was applied to port 2. Thus, the device shown at 210 and 250 operates as an optical diode depending on the direction that light is applied to the diode. The tunable materials described above with respect to FIG. 1 can be employed to construct such diodes.

Figure 3:
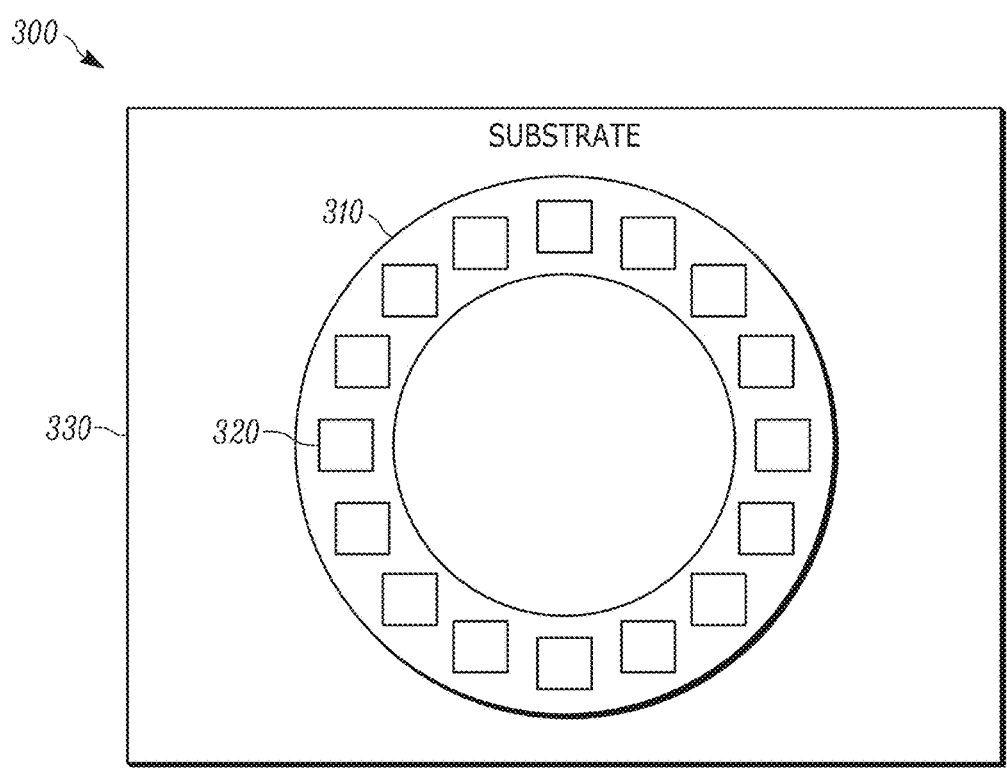
FIG. 3 illustrates an example of a toroid structure that utilizes tunable complimentary sections to provide a mode-selective laser or optical filter.

FIG. 3 illustrates an example of a device 300 having a toroid structure 310 that utilizes tunable complimentary sections such as shown at 320 to provide a mode-selective laser or optical filter, for example. As shown, the toroid structure 310 can be fabricated on a substrate 330. Thus, in one example, the toroid structure 310 operates as the first structure material described herein and the respective sections 320 operate as the second structure described herein. For example, the toroid structure 310 could be fabricated as Ytterbium (Yb):Erbium (Er):diYttrium (Y2) Trioxide (O3) (Yb:ErY2O3) and the sections 320 could be fabricated as Vanadium Dioxide (VO2). Various combinations are possible that include one or more of the previously described materials for the first structure as the toroid structure 310 and one or more of the previously described materials for the second structure as the sections 320.

Figure 4:
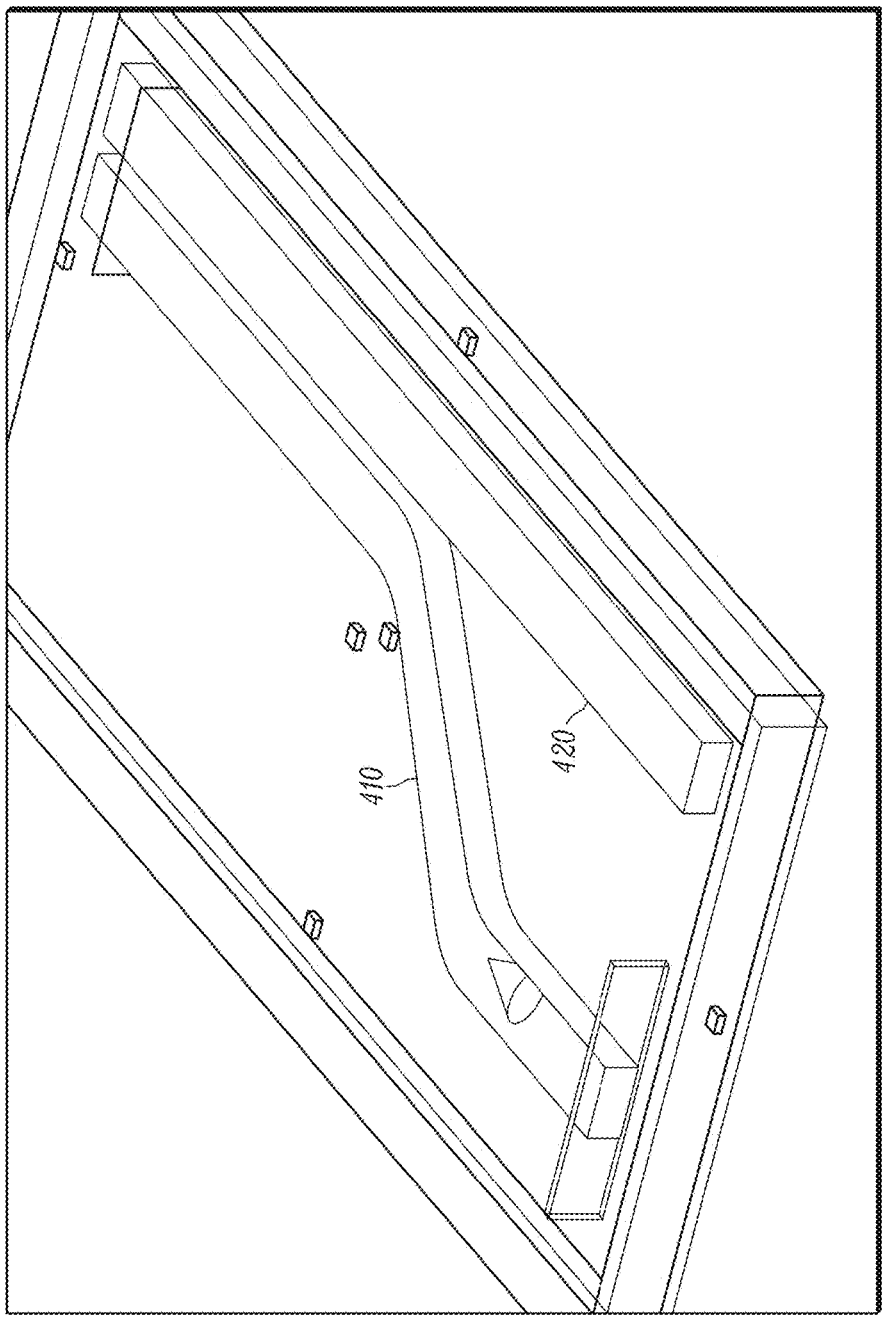
FIG. 4 illustrates an example of coupled optical waveguides that utilize tunable complex conjugate dielectric permittivity profiles to form the PT-Symmetric coupled waveguide structure.

FIG. 4 illustrates an example of an optical waveguide 400 that utilizes tunable complimentary channels to form the waveguide. In this example, the first and second structures described herein are formed as complimentary channels 410 and 420 of the waveguide 400. The waveguide can be substantially any shape include y-shaped structures, parallel complimentary channel structures, or combinations of y-shapes and parallel channel routing such as shown for the example waveguide 400. If the channel 410 were configured as the gain channel, materials such as Ytterbium (Yb):Erbium (Er):diYttrium (Y2) Trioxide (O3) (Yb:ErY2O3), or Ytterbium (Yb):Thulium (Tm):diYttrium (Y2) Trioxide (O3) (Yb:Tm:Y2O3), can be selected. If the channel 420 were selected as the loss channel, Vanadium Dioxide (VO2) and Germanium Tellurium (GeTe) may be selected. Gold (Au) nanoparticles may be added to the channel to provide static tuning in addition to the dynamic tuning provided by VO2 or GeTe, for example.

Figure 5:
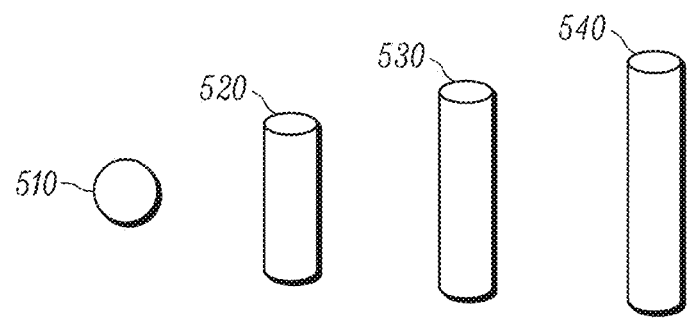
FIG. 5 illustrates particle examples to facilitate material configuration of structures and tunable materials described herein.

FIG. 5 illustrates particle examples to facilitate material configuration of structures and tunable materials described herein. The particle examples described herein are but one of many examples that can be added to a base layer to provide the refractive properties described herein. At 510, a nanoparticle or nanosphere is formed. Such particles can be formed as a single element such as Gold (Au) or a compound such as Vanadium Dioxide (VO2), for example. At 520 through 540, varying lengths of nanorods are formed wherein the rod length and/or rod diameter can be controlled to control the frequency response of a give structure as described herein. Thus, the example particles shown at 510 through 540 can be added to a structure to provide gain and loss structures as described herein and also to provide tuning capabilities as described herein.

Figure 6:
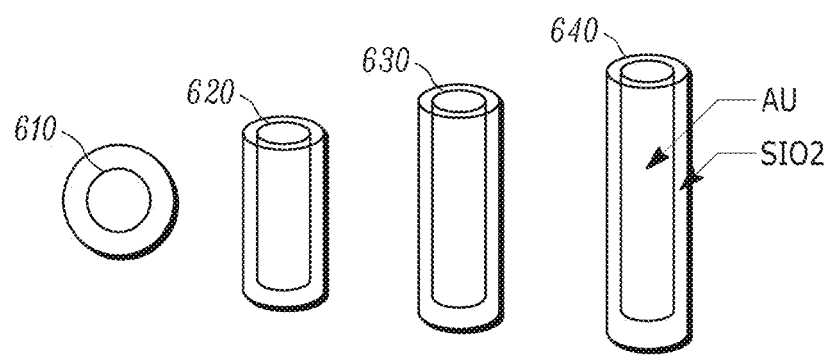
FIG. 6 illustrates encapsulated particle examples to facilitate material configuration of structures and tunable materials described herein.

FIG. 6 illustrates encapsulated particle examples 610 through 640 to facilitate material configuration of structures and tunable materials described herein. In these examples, the singular particles described above with respect to FIG. 5 are encapsulated with one other material. For example, if the inner layer of the particles 610 through 640 is formed as Gold (Au), the outer layer can be formed as Silicon Dioxide (SiO2) forming a core/shell combination of Au/SiO2. Other encapsulation particles are possible such as a core shell combination of Gold (Au) nanoparticles encapsulated in Vanadium Dioxide (VO2) forming Au/VO2.

Figure 7:
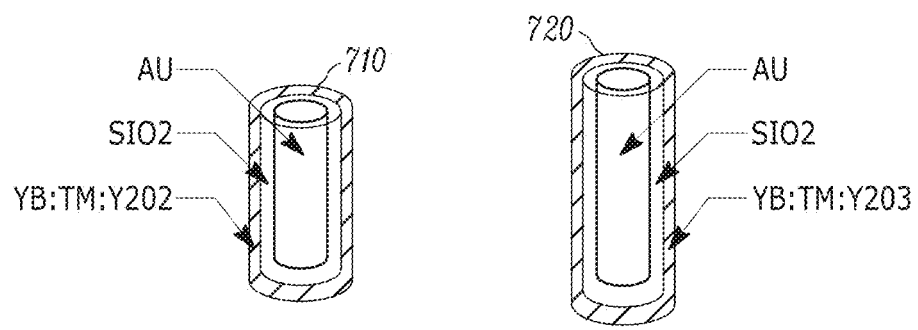
FIG. 7 illustrates multilevel encapsulated particle examples to facilitate material configuration of structures and tunable materials described herein.

FIG. 7 illustrates multilevel encapsulated particle examples 710 and 720 to facilitate material configuration of structures and tunable materials described herein. In these examples, the core/shell combinations such as illustrated in FIG. 6 can be further encapsulated in another outside layer. At 710, the outside layer can include Ytterbium (Yb):Erbium (Er):diYttrium (Y2) Trioxide (O3) (Yb:ErY2O3), for example. At 720 the outside layer can include Ytterbium (Yb):Thulium (Tm):diYttrium (Y2) Trioxide (O3) (Yb:Tm:Y2O3), for example. Various encapsulation combinations are possible in accordance with the materials previously described herein for the respective structures.

Figure 8:
FIGS. 8 through 10 illustrate an example of a method that forms tunable materials to adjust the real and imaginary dielectric permittivities of the optical material system and generate the dynamically tunable, complex conjugate dielectric permittivity profiles for operation of a PT Symmetric device.
Figure 9:
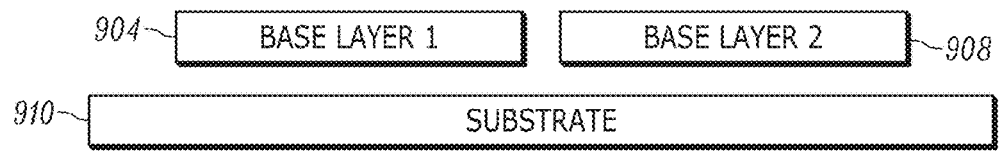
Figure 10:
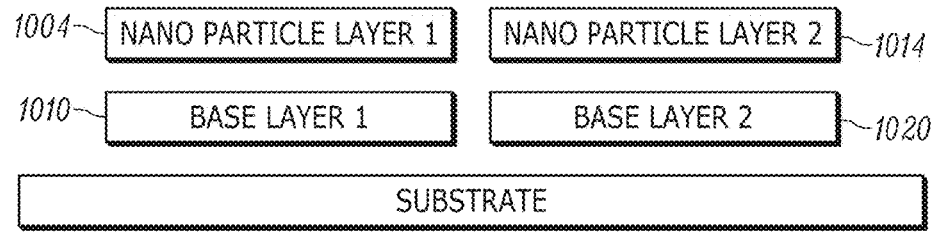

In view of the foregoing structural and functional features described above, an example method will be better appreciated with reference to FIGS. 8 through 10. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIGS. 8 through 10 illustrate an example of a processing method that forms tunable materials to adjust the dielectric permittivity of a device. At 810 of FIG. 8, the method includes forming a substrate for a photonic integrated device. The substrate can be formed utilizing growth techniques such as for a semiconductor substrate, for example. At FIG. 9, the method includes forming a base layer shown as 904 and 908 on the substrate 910. The base layer shown at 904 and 908 can be formed as a single homogenous layer on the substrate 910 or as distinct and separate portions formed on the substrate 910. In FIG. 10, the method includes forming a first nanoparticle layer 1004 in a portion of the base layer 1010 a first real dielectric permittivity and a positive imaginary dielectric permittivity. The method includes forming a second nanoparticle layer 1014 in another portion of the base layer 1020 that includes a second real dielectric permittivity and a negative imaginary dielectric permittivity material. At least one of the first nanoparticle layer and the second nanoparticle layer include a tunable material to enable adjustment of the imaginary dielectric permittivity of the respective layers.

The method can include forming the base layer as a silica sol-gel layer. This can include implanting the first or second layers on to the base layer or mixing the first or second materials within the base layer. The method can include configuring the tunable material as at least one of a nanoparticle, a nanosphere, a nanorod, and a nanostar, and adjusting the size and shape of the nanoparticle, the nanosphere, the nanorod, and the nanostar to control the optical frequency response of at least one of the first and second layers. The tunable material of the second nanoparticle layer includes at least one of Vanadium Dioxide (VO2) and Germanium Tellurium (GeTe) to provide dynamic adjustment of the device. Gold (Au) nanoparticles can be added to the tunable material of the second nanoparticle layer to provide static adjustment to the imaginary dielectric permittivity of the second layer. The tunable material can include at least one of Gold (Au) nanoparticles encapsulated in Silicon Dioxide (SiO2), and Au nanoparticles encapsulated in Vanadium Dioxide (VO2) and/or Ytterbium (Yb):Erbium (Er):diYttrium (Y2) Trioxide (O3) (Yb:ErY2O3), or Ytterbium (Yb):Thulium (Tm):diYttrium (Y2) Trioxide (O3) (Yb:Tm:Y2O3). The nanoparticles can be selected such that the particles can be pumped via laser light to produce down converted or upconverted light, the ratio of light emission at given wavelengths is tuned by controlling a ratio of Yb:Er ions, Yb:Tm ions, or Yb:Er:Tm.

Figure 11:
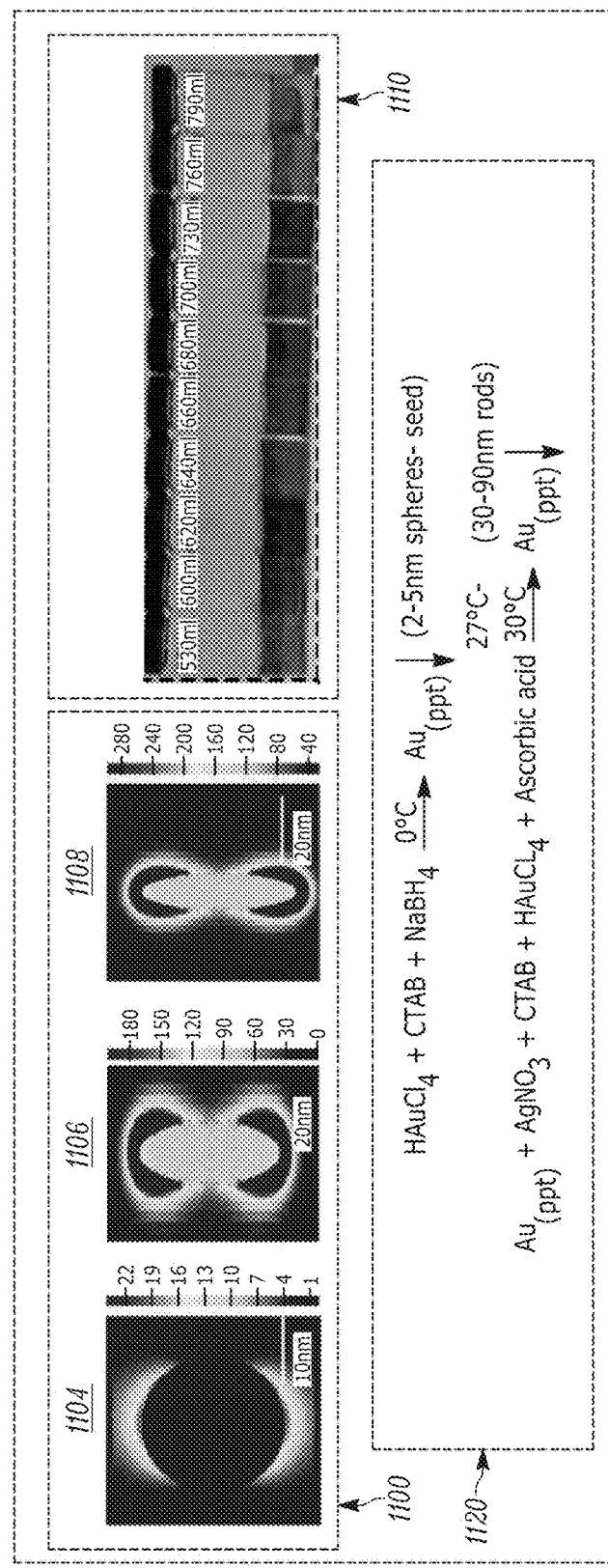
FIGS. 11 through 13 illustrate chemical synthesis methods for gold nanospheres, and nanorods of different aspect ratios and their optical properties.

FIG. 11 illustrates the chemical synthesis process that can be used to control the shape and aspect ratio of loss material (e.g., Au nanospheres and Au nanorods of different aspect ratios shown in FIG. 5). Preparation of Au nanorods relies on the reduction of the Au precursor ($HAuCl_3$) preferentially on the [111] Au crystal lattice face through the use of a surfactant, cetyl tri-methyl ammonium bromide (CTAB). The CTAB is a micelle molecule with an ammonium trimethyl bromide hydrophyllic head group and a 16-carbon chain hydrophobic end and forms a chemisorbed bilayer on the surface of Au nanorods. The surfaces of CTAB-stabilized Au nanorods possess a positive surface charge due to the cationic head groups facing the solvent. This surface charge in turn affects the distribution of ions in the surrounding interfacial region, resulting in an increased concentration of counter ions (ions of opposite charge to that of the particle) close to the surface and leads to the formation of an electrical double layer around each particle.

The liquid layer surrounding the particle exists as two parts; an inner region, called the Stern layer, where the ions are strongly bound and an outer, diffuse, region where they are less firmly bound. Within the diffuse layer there is a notional boundary inside which the ions and particles form a stable entity. When a particle moves (e.g., due to gravity), ions within the boundary move with it, but ions beyond the boundary do not travel with the particle. This boundary is called the surface of hydrodynamic shear or slipping plane. The potential that exists at this boundary is known as the zeta potential. The magnitude of the zeta potential gives an indication of the potential stability of the colloidal system. If all the particles in suspension have a large negative or positive zeta potential then they tend to repel each other and there is substantially no tendency to flocculate. However, if the particles have low zeta potential values then there is substantially no force to prevent the particles coming together and flocculating. The general dividing line between stable and unstable suspensions is generally taken at either +15 mV or −15 mV. Particles with zeta potentials more positive than +15 mV or more negative than −15 mV are considered stable.

The synthesis of stable Au nanorod colloids takes advantage of the high zeta potential of the CTAB surfactant and the fact that the ammonium trimethyl bromide hydrophyllic head group of CTAB (diameter=0.814 nm, area=0.521 $nm^2$) and the 16-carbon chain hydrophobic end are more readily accommodated on the Au [100] side edges, than on close-packed Au [111] faces. It utilizes preparation of two solutions: a seed and a growth solution. In a typical synthesis, an Au seed solution is prepared by mixing 5 ml, 0.25 mM $HAuCl_4$, 5 ml, 0.1M CTAB, and 0.6 ml, 0.1 M ice cold $NaBH_4$ to produce <5 nm CTAB-capped Au nanospheres. In the second phase, a growth solution is prepared by mixing 0.1 ml, 0.01 M $AgNO_3$, 20 ml, 0.5 mM $HAuCl_4$, 19.2 ml, 0.1M CTAB, and 0.7 ml, 0.77 M $C_6H_8O_6$.

In order to synthesize the Au nanorods, 16 μl of the seed solution was added to the growth solution. After five minutes, the colorless growth solution transforms to a deep purple color indicating the presence of Au nanorods. In order to synthesize Au nanorods with larger aspect ratios, different volumes of $AgNO_3$ are added to the growth solution ranging from around 0.2 ml to about 1.4 ml. The rate of growth of the Au seeds in the presence of CTAB is controlled by the flux of Au-laden, cationic micelles to the CTAB-capped Au particles. When the surfactant-capped seed is introduced into the solution, the Au diffuses into the soft template while the surfactant becomes a part of the soft template. The template size and shape are functions of surfactant concentration and ionic strength of the solution. Au nanorods have four [110] facets that nanospheres do not. The CTAB bilayer protects the [111] crystalline plane and facilitates the growth on the [110] facets since CTAB binds more strongly to [110] facets. Since the rods and the micelles possess high zeta potentials (+90 mV), the rate of transfer of the Au(I) ions to the rods is slowed down. The Au seeds grow almost 1000 times more slowly in the presence of CTAB. The surface potential decays more quickly at the tips due to the higher curvature and consequently the micelle flux is higher at the tips.

The diffusion-migration rate of the micelles to the rods within the double layer are higher at the tips of an Au nanorod as opposed to the sides due to the higher curvature. Preferential tip-oxidation of nanorods also have been reported which strongly supports the electric field-directed interaction between Au nanoparticles and CTAB micelles. Surfactant-containing complexes are incorporated into the [100] side edges, whereas non-complexed ion-pairs or Au(0) atoms/clusters are added to the [111] end faces. The discrimination between sites could be due to the increased stability of the close-packed [111] surfaces. Moreover, the large headgroup of CTAB (diameter=0.814 nm, area=0.521 $nm^2$) and the long alkyl chain are more readily accommodated on the [100] side edges, than on close-packed [111] faces, where the Au—Au spacing is too small to facilitate epitaxy. As the nanorods grow in length, the area of the side faces increases, and this could facilitate the assembly of a bilayer of CTAB molecules at the crystal surface. The bilayer provides stabilization and growth inhibition, and this can explain why elongation of the nanorods is rapid when the shape anisotropy has been established, in a zipping type of mechanism. When rod formation has started, further growth is encouraged by the electric field distribution at the rod ends.

Besides the enhanced light scattering and absorption, the induced collective electron oscillations associated with the surface plasmon resonance also gives rise to local electric fields near the nanoparticle surface. The induced electric field originating from the charge separation in the nanoparticle during the plasmon resonance oscillations is large at small distances from the surface. For silver nanoparticles, the value of the induced field can be tens of times larger than the incident electric field value but drops to smaller values as the distance from the surface increases. The electromagnetic field intensities in the vicinity of plasmonic nanoparticles can be calculated using a finite difference time domain (FDTD) method. The FDTD method employs second-order central differences in which space and time are discretized so that the electric and magnetic fields are staggered. Finite differences are utilized as approximations to both the spatial and temporal derivatives that appear in Maxwell's equations, specifically Faraday's and Ampere's law.

At 1100 of FIG. 11, software (e.g., via Lumerical Inc software) was used to obtain finite difference time domain (FDTD) simulations of the near field electromagnetic field distributions at resonance of a gold nanosphere (1104), a gold nanorod of aspect ratio 2.5 (1106) and a gold nanorod or aspect ratio 4 (1108) are shown. A photographic image of 10 different Au nanosphere and nanorod surfactant stabilized colloid solutions is shown at 1110 of FIG. 11. The peak plasmon resonance extinction wavelength is indicated on each glass vial and corresponds to increasing aspect ratio Au nanorods (from about 2.5 to about 5) going left to right. The far-right sample vial (labelled 530 nm) is a solution of 20 nm diameter Au nanospheres.

Figure 12:
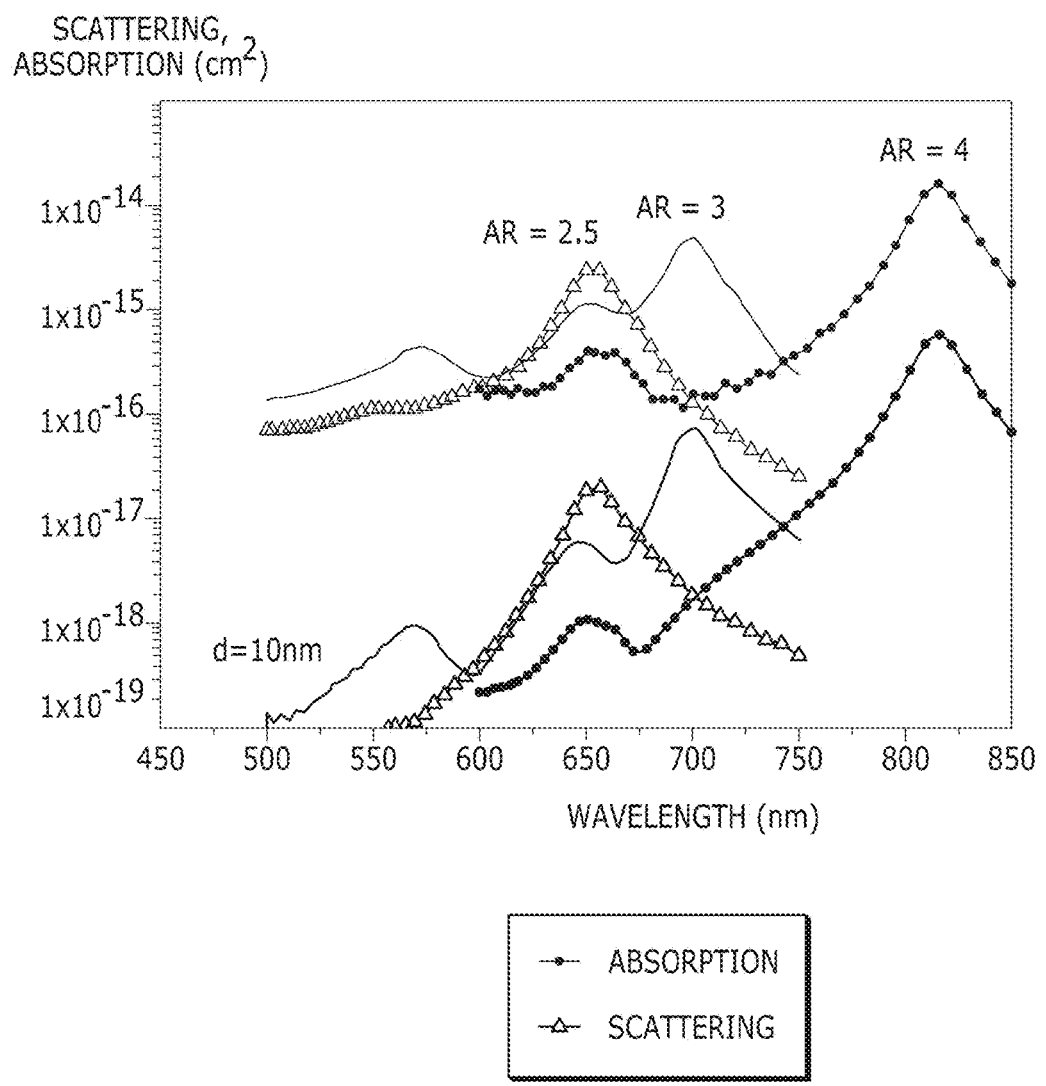

FIG. 12 shows FDTD calculated absorption and scattering cross section spectra as a function of wavelength for Au/$SiO_2$ core/shell ellipsoids (schematically illustrated FIG. 6) of 3 different aspect ratios (A.R.): AR=2.5, AR=3 and AR=4. The simulations were performed utilizing Finite Difference Time Domain (FDTD) Software The transverse diameter of the Au ellipsoid was the same in each simulation (10 nm), while the longitudinal diameter was varied from 20 nm to 40 nm yielding ellipsoids of aspect ratios from 2 to 4 with resonance wavelengths from 650 nm to 800 nm. The $SiO_2$ shell was 5 nm thick in each simulation.

Figure 13:
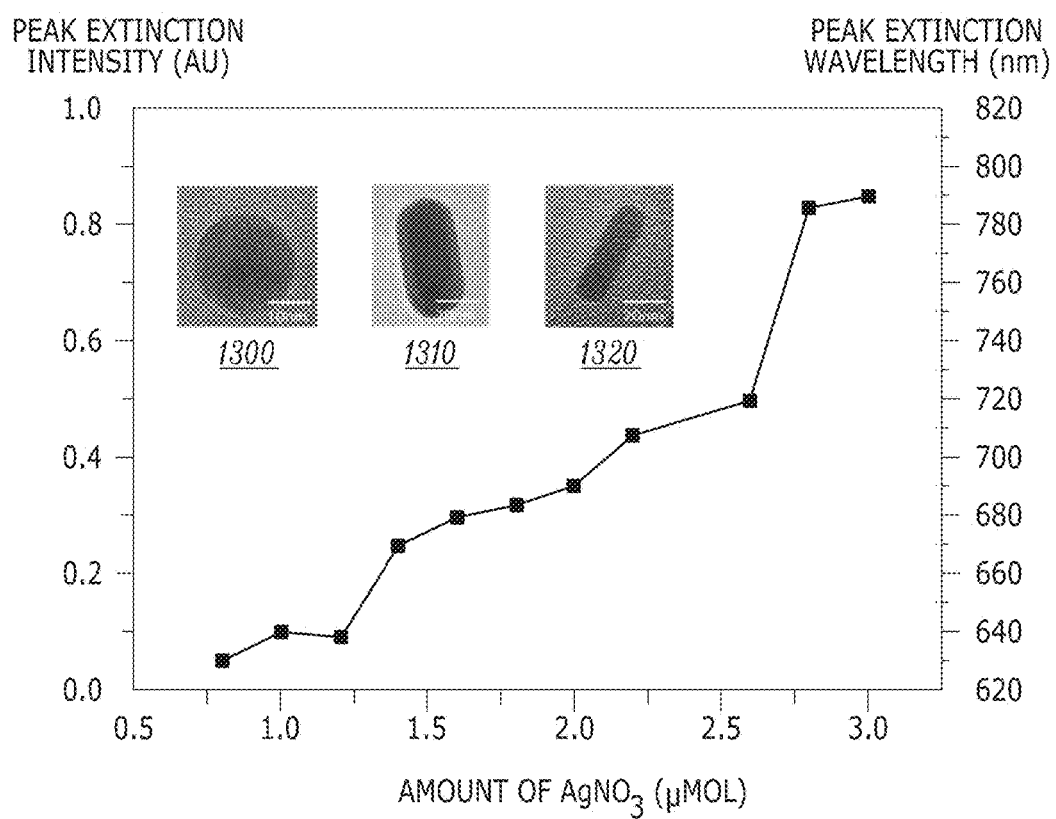

FIG. 13 shows experimentally obtained Au nanorod solution longitudinal peak extinction intensities and wavelengths as a function of $AgNO_3$ amount used in the synthesis precursor solutions 1300, 1310, and 1320. Extinction peaks from 630 nm to 810 nm of the Au nanorod-based loss material can be precisely tuned to the emission wavelength of its complex conjugate pair in a Parity Time Symmetric photonic device, e.g., a gain material such as Ytterbium (Yb):Erbium (Er):diYttrium (Y2) Trioxide ($O_3$) (Yb:ErY2O3) for example.

Figure 14:
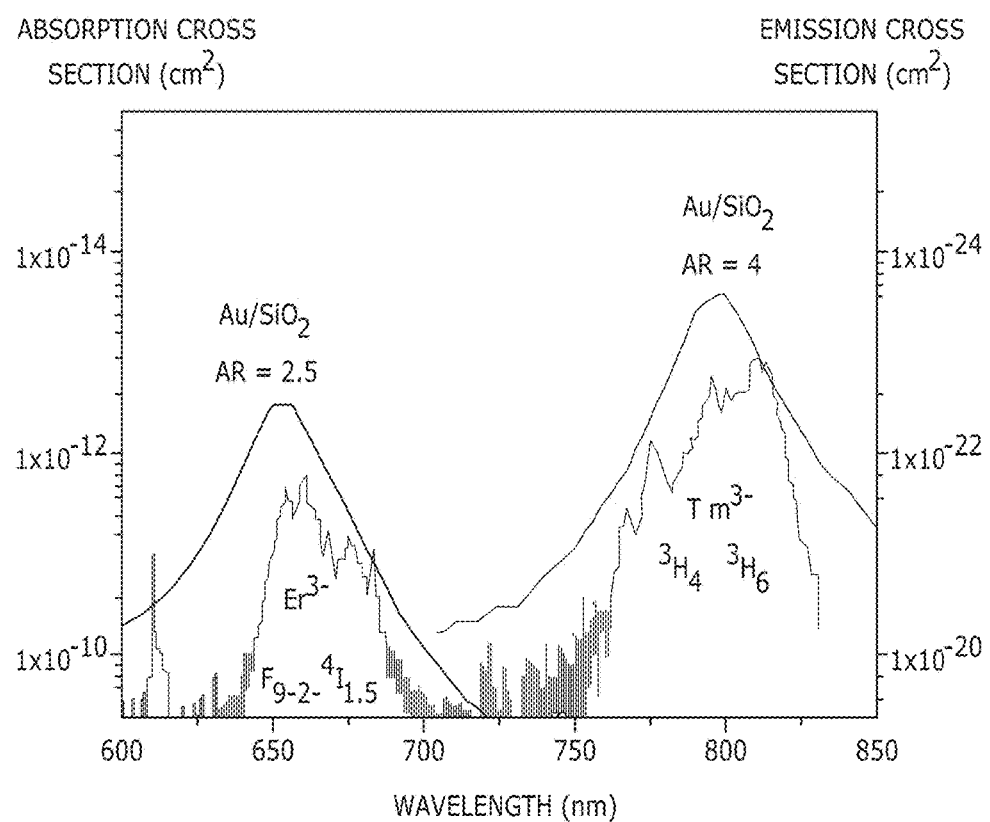
FIGS. 14 through 26 illustrate materials and methods by which the non-Hermiticity value of the PT Symmetric structure can be tuned by controlling the loss value as well as the optical frequency response.

FIG. 14 shows absorption and emission cross sections of a spectrally matched complex conjugate pair of nanomaterials: absorption cross section of 1 Au/SiO2 core/shell nanorod of AR 2.5 and emission cross section of 1 $Er^{3+}$ ion as well as the absorption cross section of 1 Au/SiO2 core/shell nanorod of AR 4 and the emission cross section of 1 $Tm^{3+}$ ion. As an approximation, one can theoretically obtain a ε"=0 effective medium, a neutral point or point of zero imaginary dielectric permittivity at any given pump power with this system by setting the ratio of Au nanorod:rare earth ion emitter (or other nanoparticle-based photoluminescent emitter) that can be incorporated into an optically transparent polymer or sol gel system. This can include processing via standard CMOS, electronic and photonic integrated circuit materials and processing techniques (e.g., spin coating, chemical vapor deposition (CVD), plasma enhanced chemical vapor deposition (PECVD), wet etching (HF, $H_2SO_4$ etc.), electron beam lithography (EBL), deep ultraviolet (UV) photolithography, reactive ion etch (RIE) and other applicable processes.

The gain and loss complex conjugate material pair can be designed to have a desired non-Hermiticity parameter. The value of the non-Hermiticity parameter determines the behavior of the system and determines the threshold for the optical exceptional point, the phenomena that leads to the phenomena observed such as non-reciprocal light transmission and single mode lasing. The non-Hermiticity parameter can be adjusted by controlling the number ratios of spectrally matched Au nanorods and its complex conjugate gain pair such as Yb:Er:Y2O3. In loss/gain core/shell nanoparticles such as Au/SiO2/Yb:ErY2O3 (710) or Au/SiO2/Yb:ErTm:Y2O3 (720) as shown in FIG. 7. The effective dielectric permittivity of the core/shell nanorod-based composite optical material at a given pumping power and excitation wavelength can be tuned through a large range of imaginary dielectric permittivity (loss and gain) values by adjusting the number of $Er^{3+}$ and $Tm^{3+}$ ions in the shell of a single core/shell nanoparticle.

If the gain and loss in the particle should be balanced, the absorption cross section of the Au nanorod at a given frequency and pump excitation power about equals the emission cross section of the embedded rare earth ions at that frequency and excitation pump power. For example, at one extreme, incorporating no $Er^{3+}$ and $Tm^{3+}$ ions in the Au/SiO2/Yb:ErY2O3 or Au/SiO2/Yb:Tm:Y2O3 core/shell nanorod, (e.g., a Au/SiO2/Yb:Y2O3) will be the most lossy while adding increasing amounts of $Er^{3+}$ and $Tm^{3+}$ (e.g., increments of 0.05% up to a point where photoluminescent quenching doesn't occur, usually <1%) and increasing the excitation pump power incident on the sample.

Figure 15:
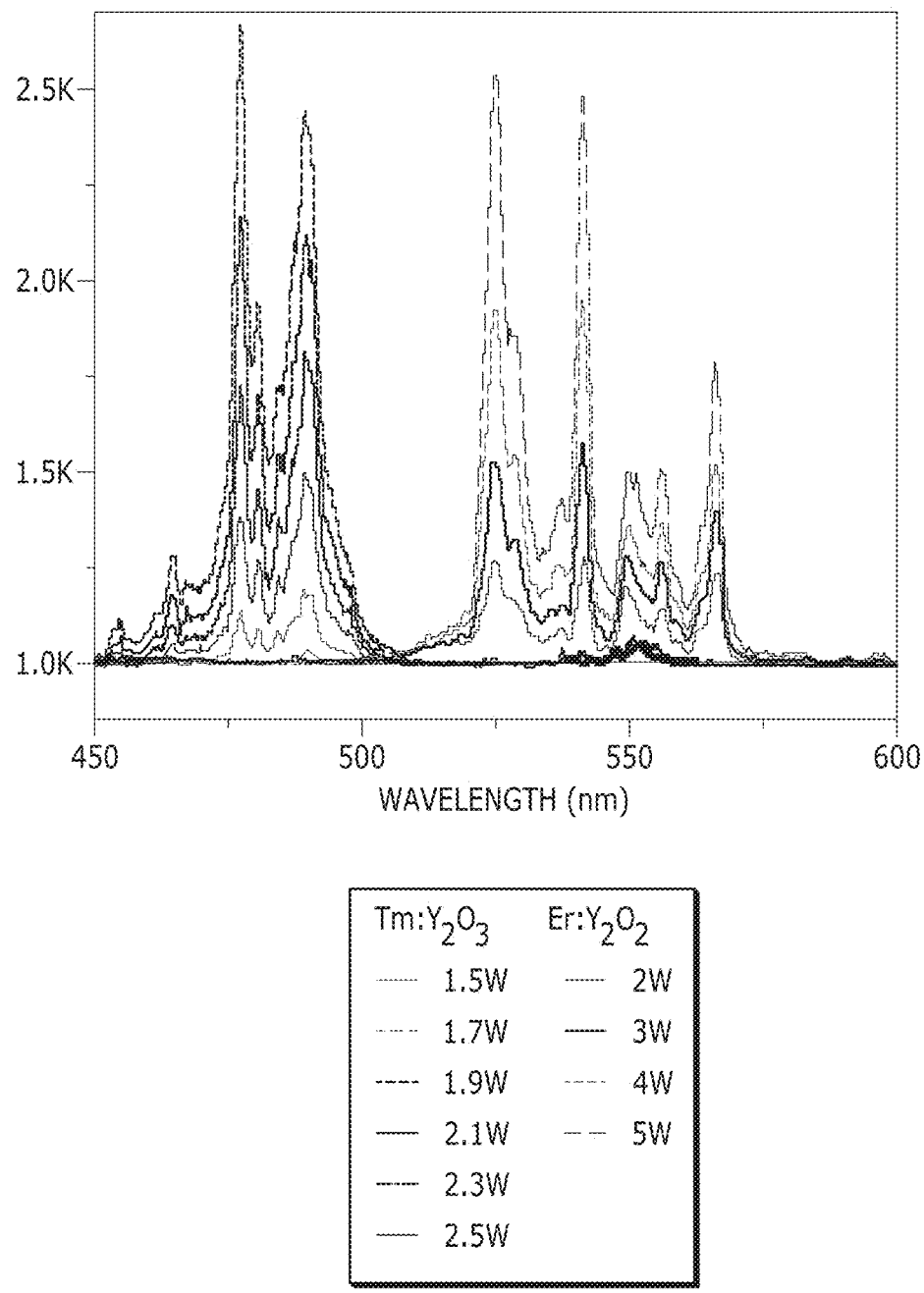

FIG. 15 shows photoluminescent (optical gain) spectra of Yb:Er:Tm:Y2O3 with increasing excitation pump power (980 nm laser diode). For example, there exists a point in the gain spectrum of the materials shown in FIG. 15 that matches.

Figure 16:
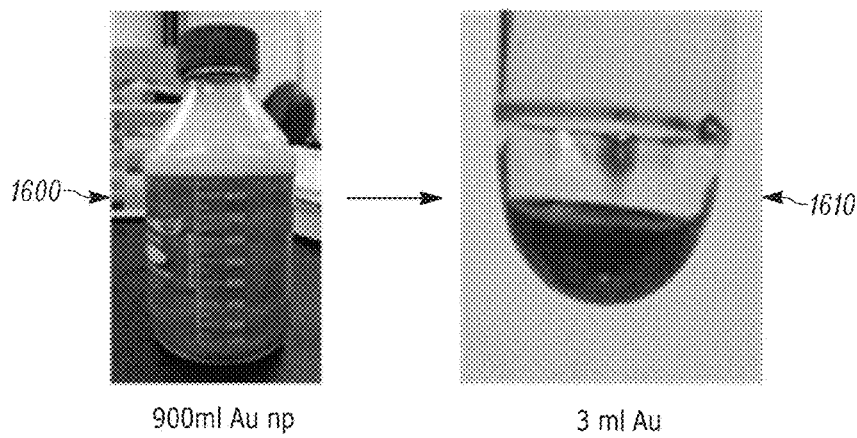
Figure 16:
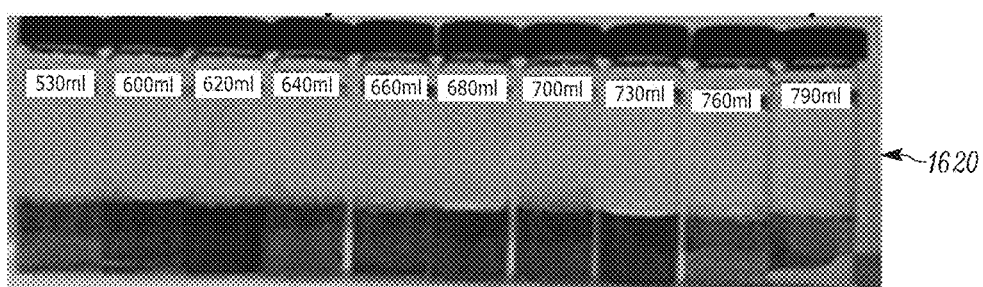
Figure 16:
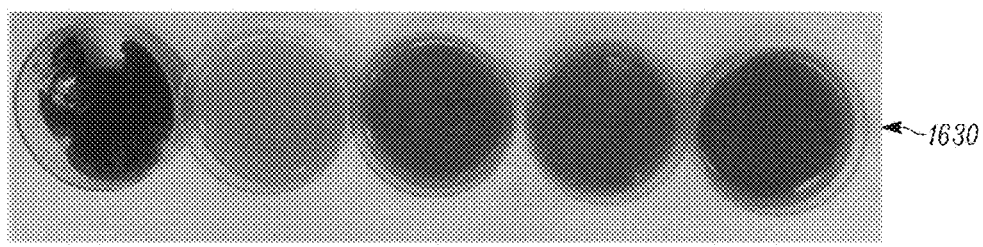

FIG. 16 shows how both the spectrum and the value of the loss material can be adjusted in the proposed systems and methods described herein. At 1600, a bottle containing 900 ml of Au nanorods is shown. At 1610, that 900 ml solution is centrifuged down to 3 ml. This adjustment means that any loss value across the range of attainable absorption spectra at 1620 can be precisely dialed in. At 1630, Au, Au/SiO2, Au/SiO2/Yb:ErY2O3 and Au/SiO2/Yb:ErTm nanorods can be incorporated into any number of optically transparent polymers, photoactive polymers (e.g., Organic Light emitting diodes (OLEDs) or organic photovoltaic (OPVs)) or silica gels. High quality optical devices can be manufactured with standard CMOS processing thus enabling rapid prototyping of PT Symmetric devices.

Figure 17:
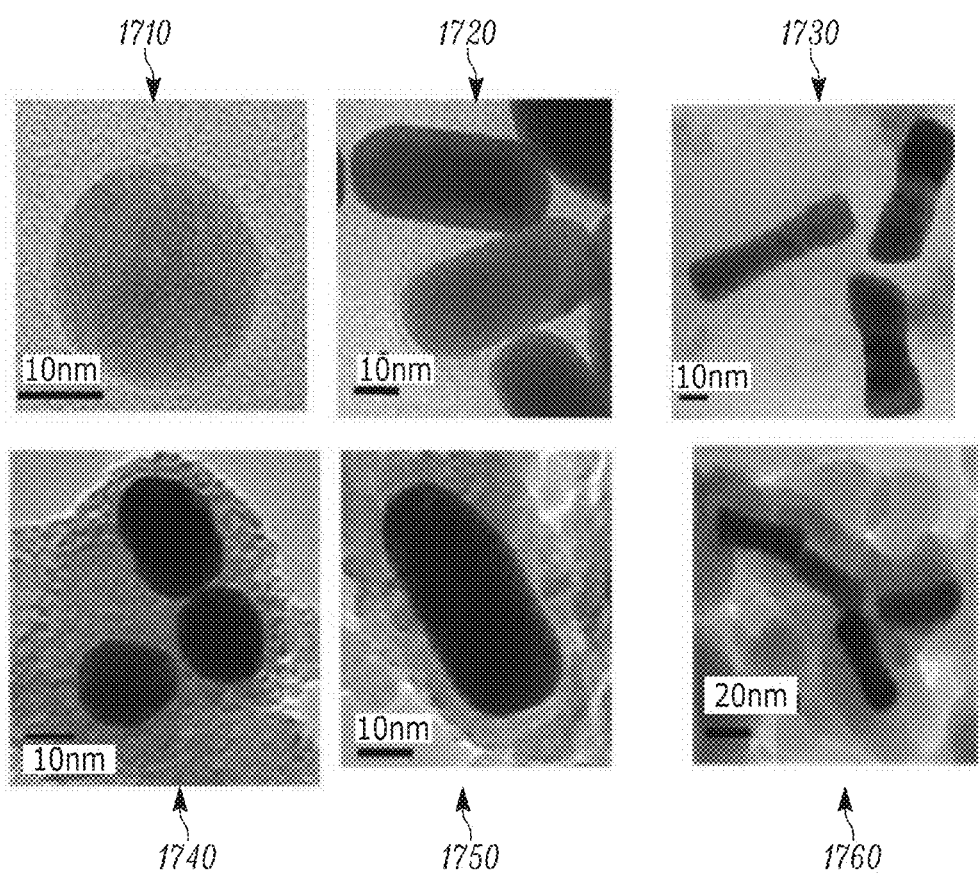

FIG. 17 shows transmission electron microscope (TEM) images of Au nanospheres (1710), Au nanorods, AR 2.5 (1720), Au nanorods AR 4 (1730), Au/SiO2 Core/Shell nanospheres (1740), Au/SiO2 Core/Shell nanorods AR 2.5 (1750) and Au/SiO2 Core/Shell nanorods AR 4 (1760).

Figure 18:
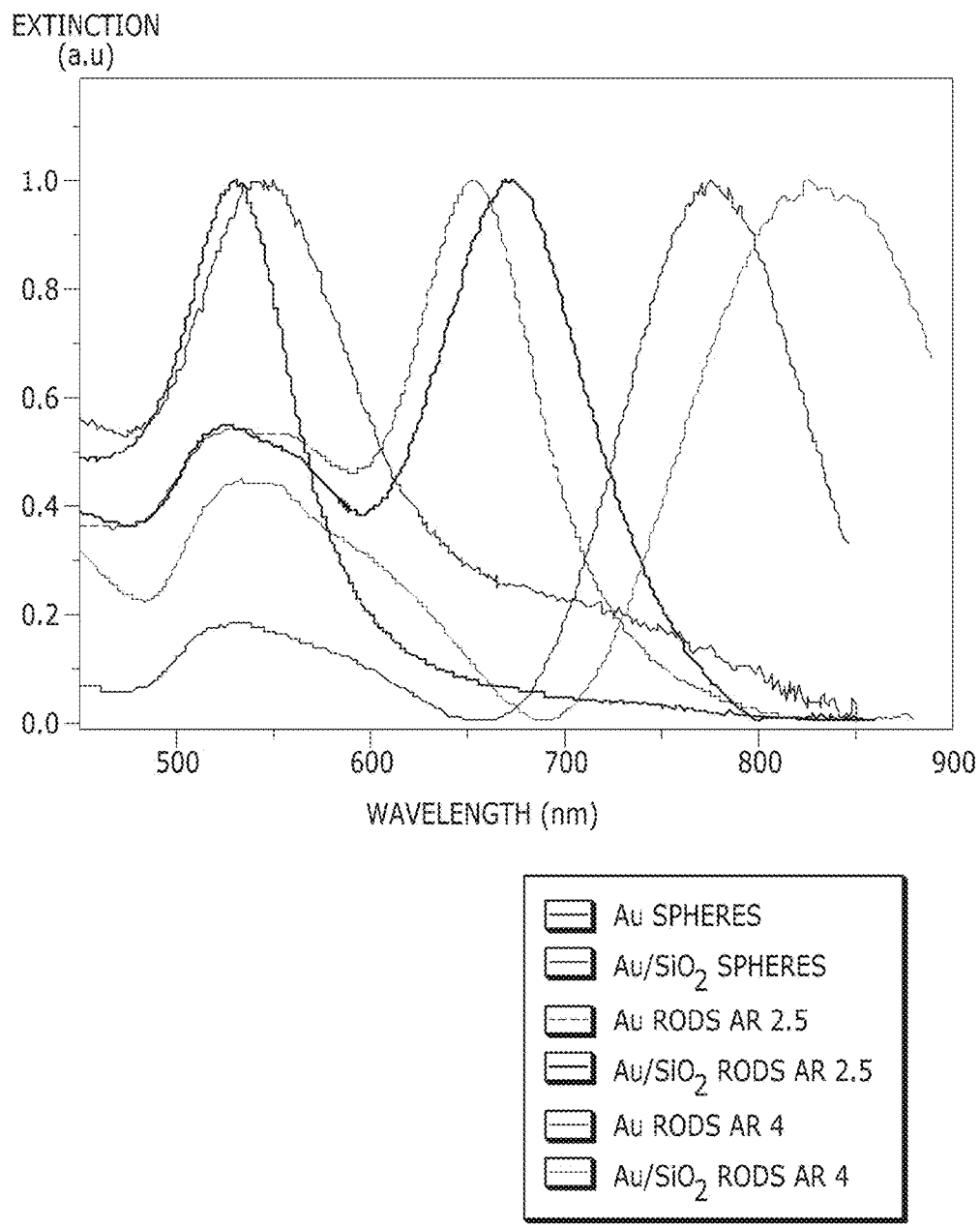

FIG. 18 shows Ultra-Violet and Visible (UV-Vis) spectra of solutions of Au nanospheres (1710), Au nanorods, AR 2.5 (1720), Au nanorods AR 4 (1730), Au/SiO2 Core/Shell nanospheres (1740), Au/SiO2 Core/Shell nanorods AR 2.5 (1750) and Au/SiO2 Core/Shell nanorods AR 4 (1760).

Figure 19:
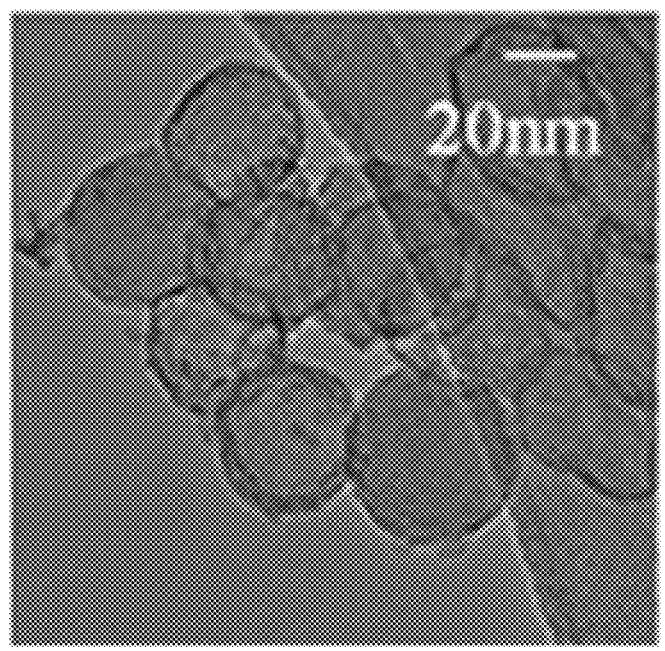

FIG. 19 shows TEM images of 20 nm radius SiO2/Yb:ErTm:Y2O3 core/shell nanospheres that can be used to provide precisely tunable (both through the number of gain nanospheres added to the optically transparent polymer or silica sol gel host matrix amounts of gain in PT Symmetric devices.

Figure 20:
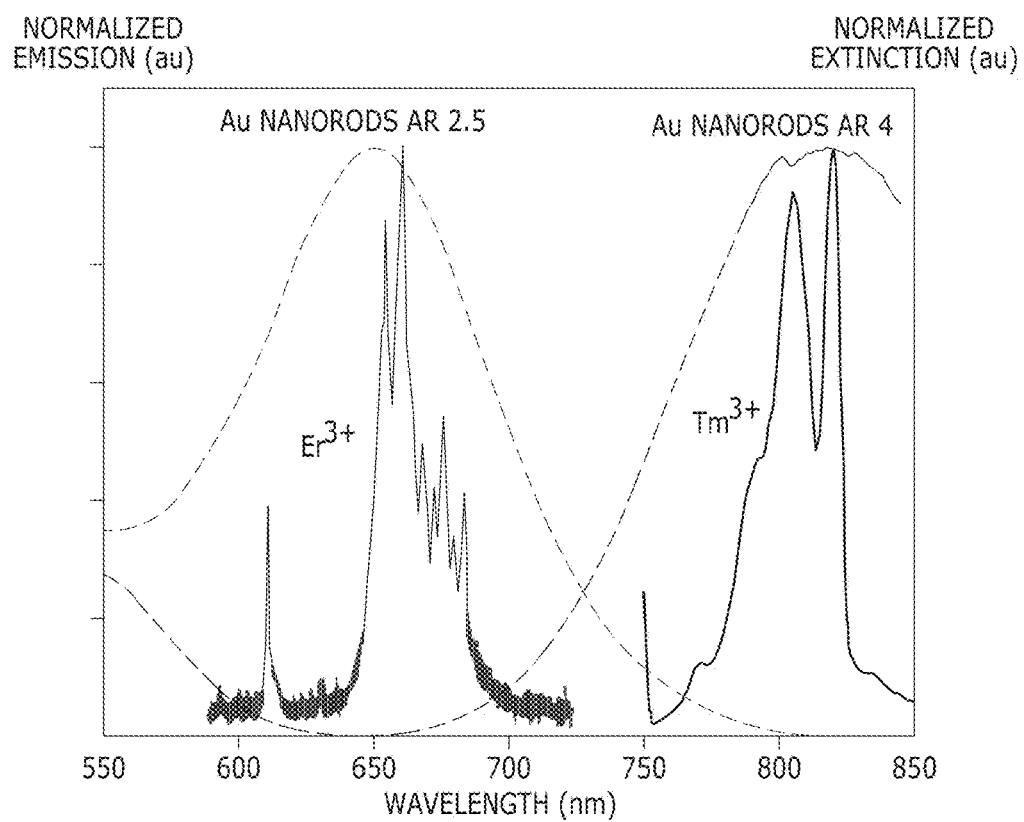

FIG. 20 shows emission spectra of $Er^{3+}$ and $Tm^{3+}$ in the 20 nm radius SiO2/Yb:ErTm:Y2O3 core/shell nanosphere spectrally matched to Au nanorods of AR 2.5 (matched to $Er^{3+}$ emission) and Au nanorods of AR 4 (matched to $Tm^{3+}$ emission).

Figure 21:
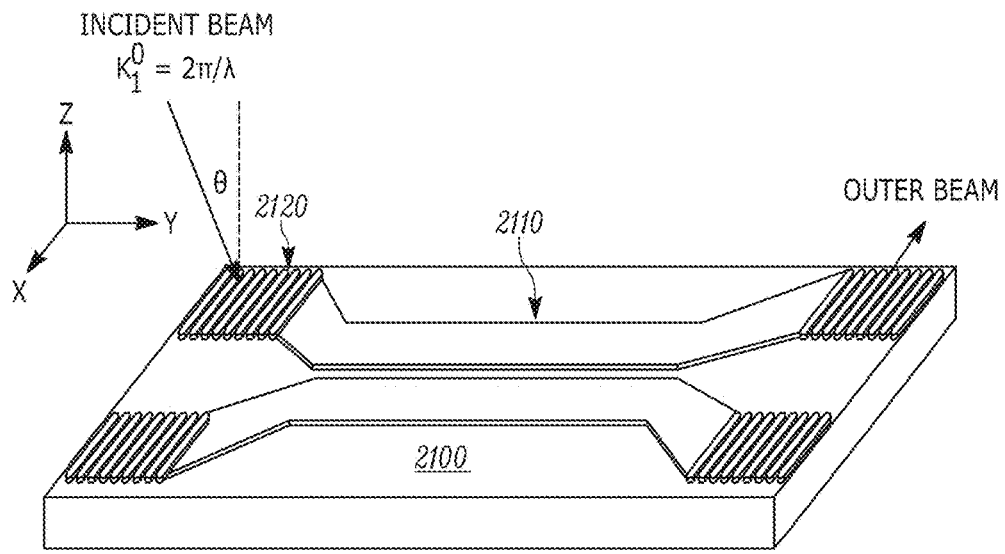
Figure 22:
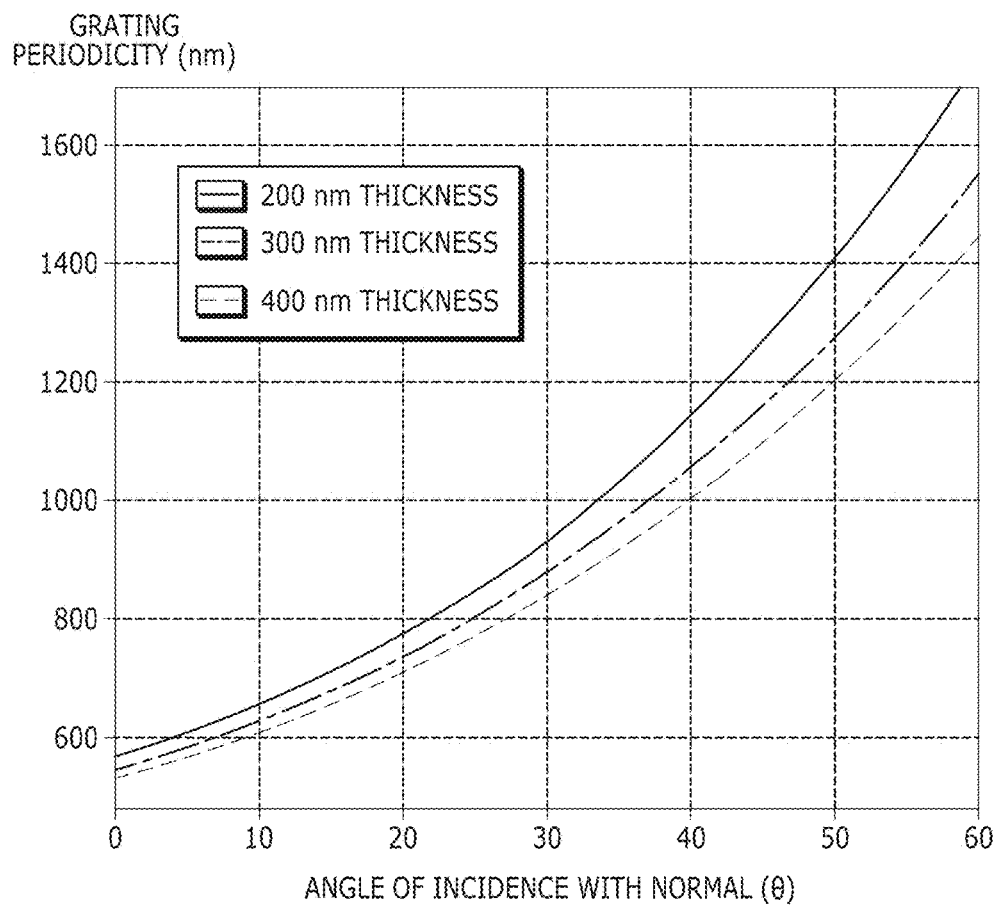
Figure 23:
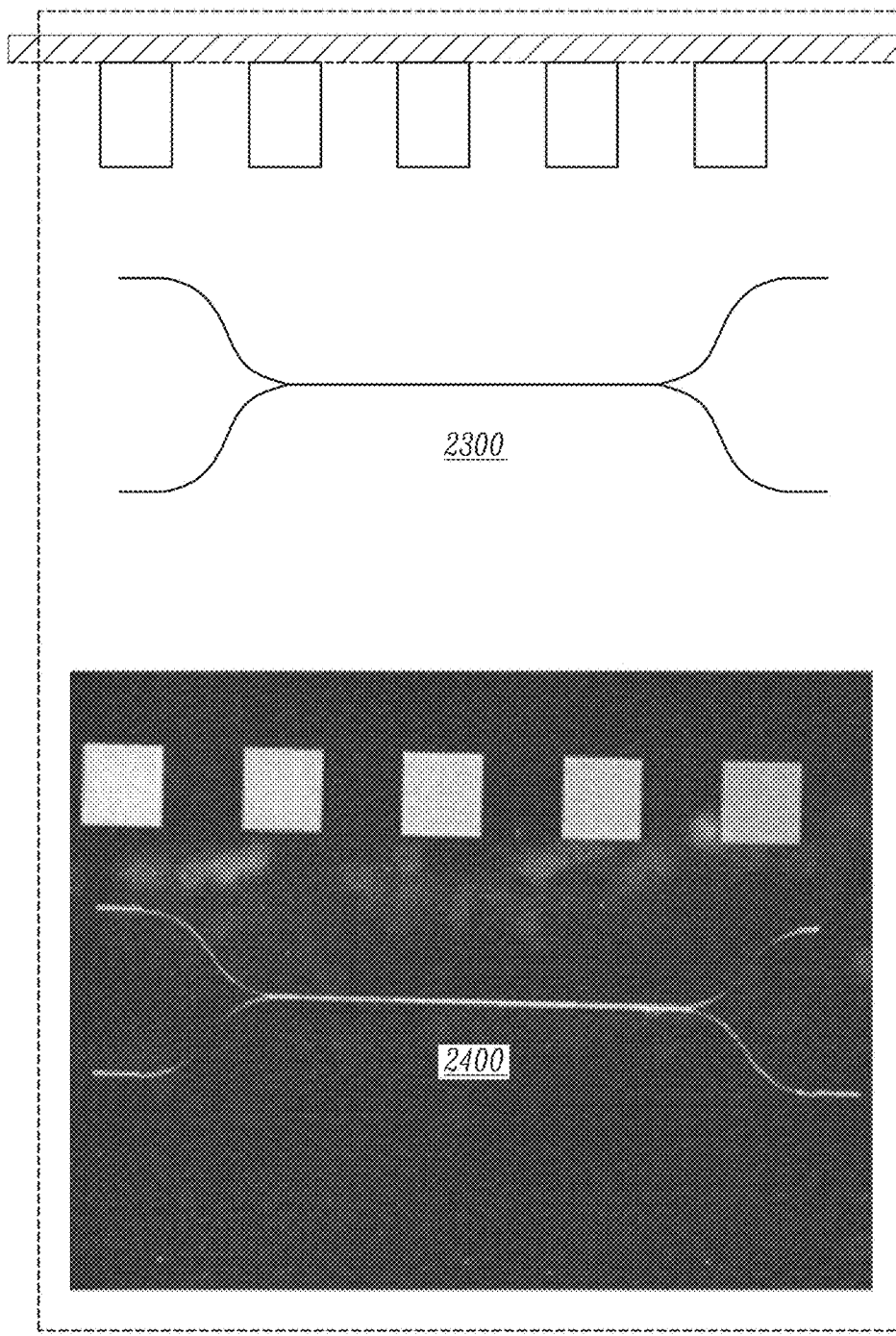

FIG. 21 shows an illustration of a coupled waveguide system 2100 in which one channel contains a precise amount of loss (2110) and the other channel contains a balanced amount of gain at the same frequency at which the loss material is designed. The gain in the channel is controlled by both the amount of gain in the system as well as the gain material excitation pump intensity. The four ports or the device 2100 are defined by gratings (2120) patterned on the surface of the waveguide channel. FIG. 22 shows grating periodicity as a function of angle of incidence with normal for three different grating thicknesses. FIG. 23 shows the design of the coupled waveguides (2300) and a microscope image of fabricated coupled optical waveguides (2400) with gain (Rhodamine 6G) and Loss (Au nanoparticles) embedded in poly (methyl methacrylate) PMMA.

Figure 24:
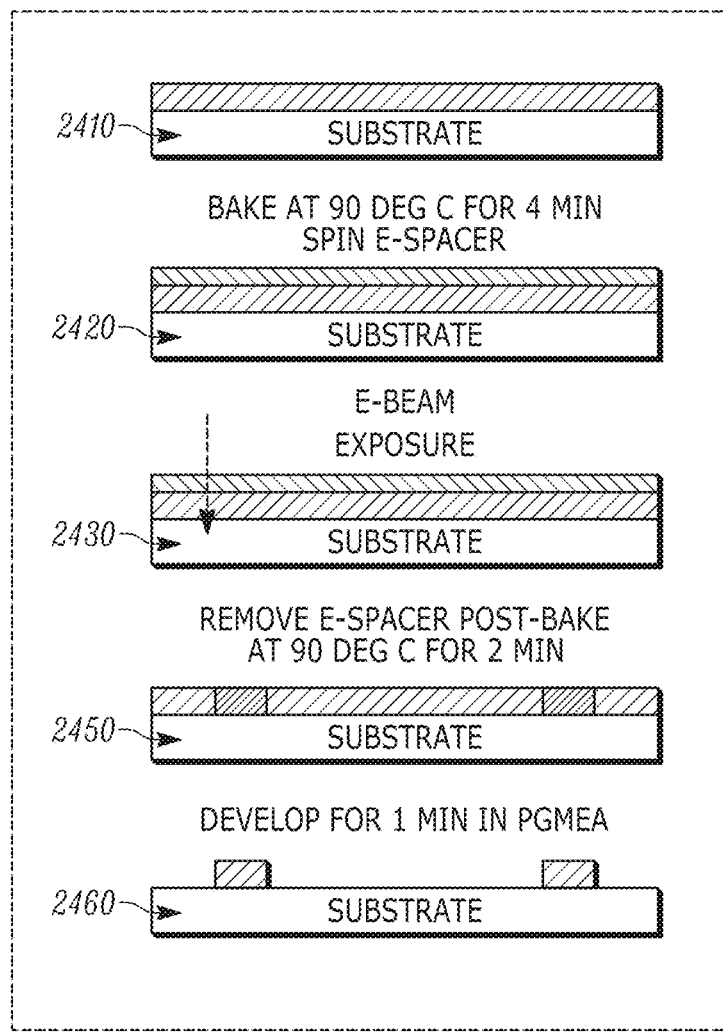

FIG. 24 shows the processing steps used to obtain the coupled waveguide structure shows in FIG. 23. At 2410, PMMA is spin coated onto a glass slide and baked at about 90 C for 4 min. At 2420, an e-spacer is spin coated onto the PMMA layer to reduce charging and prepare the sample for electron beam exposure. At 2430, the loss channel (e.g., PMMA containing Au, Au/SiO2 or Au/SiO2/Yb:ErY2O3, Au/SiO2/Yb:ErTm:Y2O3, Au/SiO2 or Au/SiO2/VO2 nanoparticles) of the device is defined. At 2430, an e-spacer is removed and a post-bake step at 90 C for 2 minutes is performed. The loss channel can be defined by developing in propylene glycol monomethyl ether acetate (PGMEA) developer for about one minute. The process can be repeated for the gain channel (e.g., PMMA containing Yb:Er:Y2O3, Yb:Er:Tm:Y2O3, Eu:Y2O3 nanoparticles or organic laser dye such as R6G). The gain and loss additives can be selected such that the resulting gain and loss channels are spectrally matched but complex conjugates of each other (the gain value of the gain channel is about equal and opposite to the loss value of loss channel while maintaining the same (or similar) refractive index).

Figure 25:
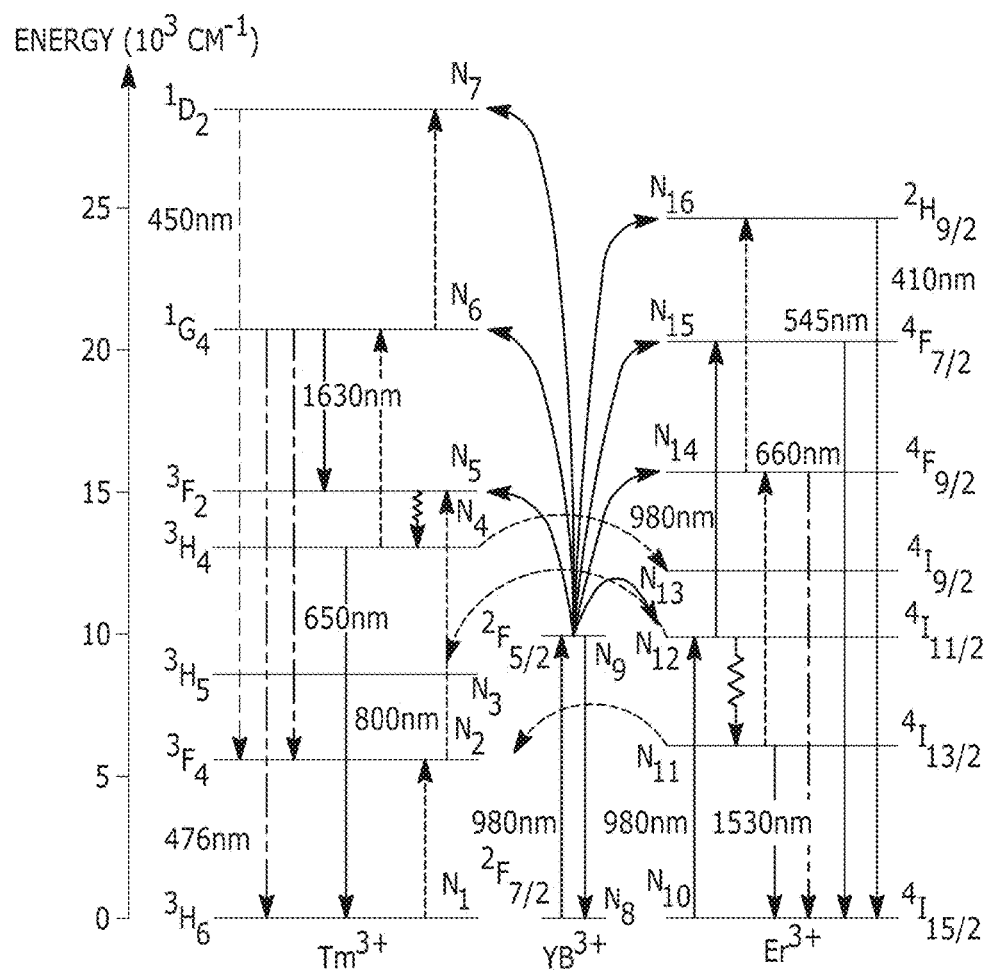
Figure 26:
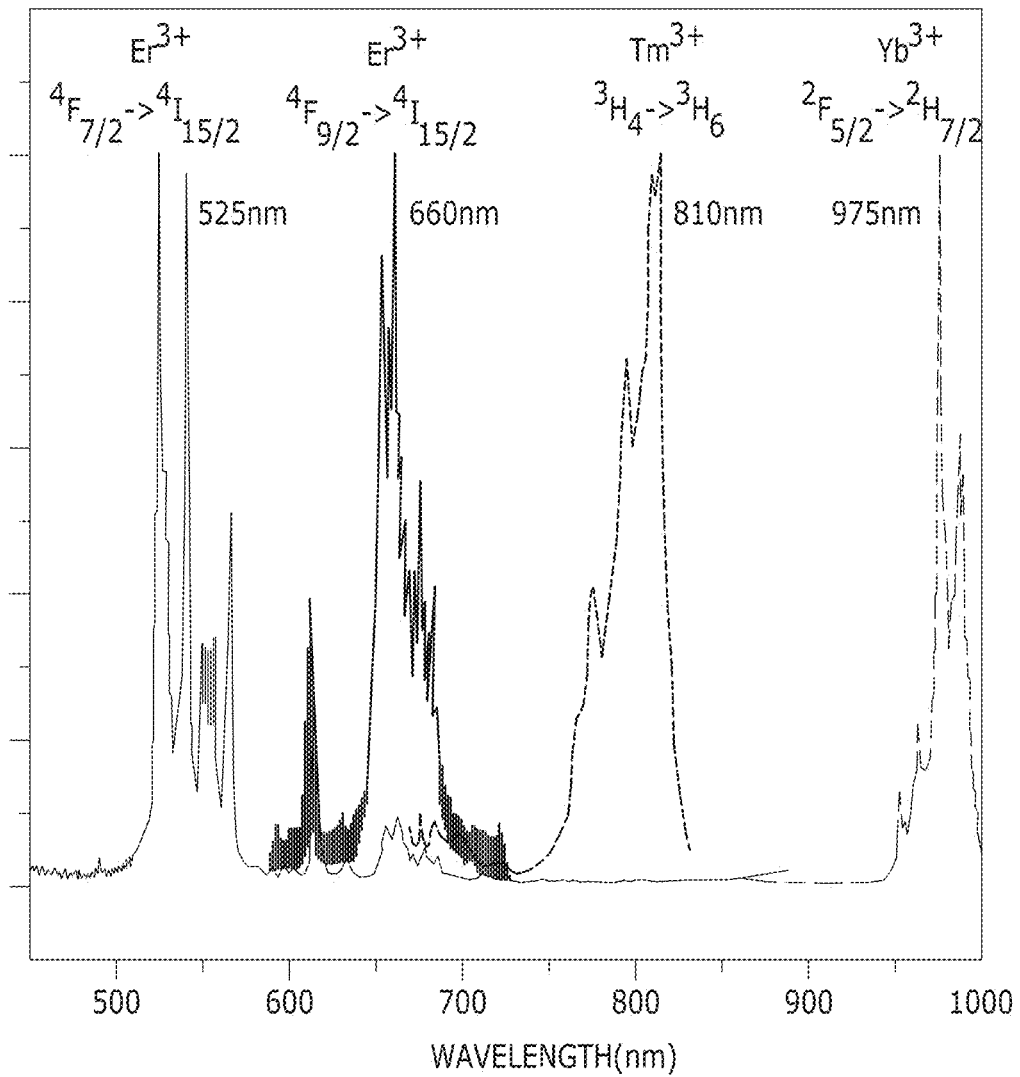

FIG. 25 shows an upconversion energy diagram for $Yb^{3+}$, $Er^{3+}$ and $Tm^{3+}$. Upconversion is a potential pump excitation mechanism for this system. FIG. 26 Shows emission spectra for $Er^{3+}$, $Tm^{3+}$ and $Yb^{3+}$ gain media. The spectral response of the complex conjugate loss media can be designed to spectrally match the gain medium in a PT Symmetric device.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. A device, comprising:
a light adjustment apparatus having at least one material having a dielectric permittivity, the at least one material to affect the flow of light, wherein the light adjustment apparatus includes a tunable material to enable adjustment of the dielectric permittivity of the at least one material.

2. The device of claim 1, wherein the at least one material of the light adjustment apparatus is formed as a single structure via an inverse-device design construction that maps real and imaginary dielectric permittivity space, wherein selected areas of the structure operate at an operating frequency as a loss media to attenuate a light signal at the operating frequency or operate as a gain media to amplify the light signal at the operating frequency.

3. The device of claim 2, wherein a temperature pulse, electrical pulse, or a light pulse is applied to the tunable material of the device to dynamically and controllably adjust a real and/or imaginary dielectric permittivity of at least one of the gain or loss media.

4. The device of claim 1, wherein the tunable material is configured as at least one of a nanoparticle, a nanosphere, a nanorod, and a nanostar, where the size of the nanoparticle, the nanosphere, the nanorod, and the nanostar is adjusted to control the resonant optical frequency response of the at least one material.

5. The device of claim 4, wherein the tunable material includes at least one of Vanadium Dioxide (VO2) and Germanium Tellurium (GeTe) mixed in a transparent optical polymer or sol gel matrix to provide dynamic adjustment of the dielectric permittivity of the device, and includes Gold (Au) nanoparticles added to the tunable material to provide static adjustment of an imaginary dielectric permittivity of the at least one material.

6. The device of claim 5, wherein the tunable material includes at least one of Gold (Au) nanospheres, nanorods or nanostars encapsulated in Silicon Dioxide (SiO2), and Au nanospheres, nanorods or nanostars encapsulated in Silicon Dioxide (SiO2) and Vanadium Dioxide (VO2) in a Au/SiO2/VO2 core/shell/shell configuration, mixed in a transparent optical polymer or sol gel matrix that includes at least one of Poly-Methyl Methacrylate (PMMA), Polydimethylsiloxane (PDMS), (SU-8) and Silica sol gel materials.

7. The device of claim 1, wherein the tunable negative dielectric permittivity of the at least one material includes Ytterbium (Yb):Erbium (Er):diYttrium (Y2) Trioxide (O3) (Yb:ErY2O3), or Ytterbium (Yb):Thulium (Tm):diYttrium (Y2) Trioxide (O3) (Yb:Tm:Y2O3) mixed in an optical polymer or sol gel matrix that includes at least one of Polymethyl Methacrylate (PMMA), Polydimethylsiloxane (PDMS), (SU-8) and Silica Sol gel materials.

8. The device of claim 1, wherein the tunable negative dielectric permittivity of the at least one material includes Rhodamine 6G, Rhodamine B, or Fluorescein mixed in mixed in a transparent optical polymer or sol gelmatrix that includes at least one of Polymethyl Methacrylate (PMMA), Polydimethylsiloxane (PDMS), (SU-8) and Silica sol gel materials.

9. The device of claim 1, wherein the dielectric permittivity of the at least one material includes Zinc Oxide (ZnO), Gallium Nitrate (GaN), Indium Phosphate (InP), or Indium Gallium Arsenide (InGaAs).

10. The device of claim 1, wherein the at least one material is configured as complimentary disks in an optical diode, as complimentary channels of a waveguide, as alternating sections of balanced loss and gain azimuthally arranged about a micro-ring resonator, or an inverse design-based structure in which the regions of loss and gain are optimized for the desired operation frequency and functionality.

11. The device of claim 1, wherein the at least one material is configured as a toroid and enables a mode selective laser or an optical filter.

12. A method, comprising:
forming a substrate for a photonic integrated device;
forming a base layer on the substrate;
forming a first nanoparticle layer in a portion of the base layer that includes a first dielectric permittivity material; and
forming a second nanoparticle layer in another portion of the base layer that includes a second dielectric permittivity material, wherein at least one of the first nanoparticle layer and the second nanoparticle layer include a tunable material to enable adjustment of the first or second dielectric permittivity of the respective layers.

13. The method of claim 12, further comprising forming the base layer as a silica sol-gel layer.

14. The method of claim 13, further comprising implanting the first or second nanoparticle layers on to the base layer or mixing the first or second dielectric permittivity materials within the base layer.

15. The method of claim 12, further comprising:
configuring the tunable material as at least one of a nanoparticle, a nanosphere, a nanorod, and a nanostar, and adjusting the size and shape of the nanoparticle, the nanosphere, the nanorod, and the nanostar to control the optical frequency response of at least one of the first and second nanoparticle layers.

16. The method of claim 15, wherein the tunable material of the second nanoparticle layer includes at least one of Vanadium Dioxide (VO2) and Germanium Tellurium (GeTe) to provide dynamic adjustment of the device, and includes Gold (Au) nanoparticles are added to the tunable material of the second nanoparticle layer to provide static adjustment to the dielectric permittivity of the second layer.

17. The method of claim 16, wherein the tunable material includes at least one of Gold (Au) nanoparticles encapsulated in Silicon Dioxide (SiO2), and Au nanoparticles encapsulated in Vanadium Dioxide (VO2) and/or Ytterbium (Yb):Erbium (Er):diYttrium (Y2) Trioxide (O3) (Yb:ErY2O3), or Ytterbium (Yb):Thulium (Tm):diYttrium (Y2) Trioxide (O3) (Yb:Tm:Y2O3).

18. The method of claim 17, wherein the nanoparticles are selected such that the particles are pumped via laser light to produce downconverted or upconverted light, the ratio of light emission at given wavelengths is tuned by controlling a ratio of Yb:Er ions, Yb:Tm ions, or Yb:Er:Tm ions.

19. A photonic integrated circuit, comprising:
a first structure that includes a first dielectric permittivity; and
a second structure that includes a second dielectric permittivity, wherein the first and the second structure include a tunable material to enable adjustment of the dielectric permittivity of the respective structures, the tunable material of the first or second structure includes nanoparticles incorporated in a silica sol gel or optically transparent polymer.

20. The integrated circuit of claim 19, wherein the first and second structure are configured as complimentary channels of a coupled parallel waveguide pair, a coupled microdisk pair, a micro-toroid pair, or an on-chip integrated ring resonator pair in an optical diode.

* * * * *